US012668233B2

(12) United States Patent
Suzuki et al.

(10) Patent No.: US 12,668,233 B2
(45) Date of Patent: Jun. 30, 2026

(54) PARKING ASSIST DEVICE, CONTROL METHOD, AND NON-TRANSITORY STORAGE MEDIUM

(71) Applicant: TOYOTA JIDOSHA KABUSHIKI KAISHA, Toyota (JP)

(72) Inventors: Daisuke Suzuki, Okazaki (JP); Takeshi Shioya, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 18/529,628

(22) Filed: Dec. 5, 2023

(65) Prior Publication Data

US 2024/0190415 A1 Jun. 13, 2024

(30) Foreign Application Priority Data

Dec. 7, 2022 (JP) ................................. 2022-195748

(51) Int. Cl.
*B60W 30/06* (2006.01)
*B60W 50/14* (2020.01)
*G08G 1/14* (2006.01)

(52) U.S. Cl.
CPC ............ *B60W 30/06* (2013.01); *B60W 50/14* (2013.01); *G08G 1/143* (2013.01); *B60W 2552/53* (2020.02); *B60W 2556/45* (2020.02); *B60W 2756/10* (2020.02)

(58) Field of Classification Search
CPC .. B60W 30/06; B60W 50/14; B60W 2552/53; B60W 2556/45; B60W 2756/10; G08G 1/143; G08G 1/16
See application file for complete search history.

(56) References Cited

U.S. PATENT DOCUMENTS

| | | | |
|---|---|---|---|
| 9,522,661 | B2 | 12/2016 | Inoue et al. |
| 9,604,638 | B2 | 3/2017 | Kiyokawa et al. |
| 9,738,276 | B2 | 8/2017 | Kiyokawa et al. |
| 9,828,028 | B2 | 11/2017 | Ishijima et al. |
| 9,836,658 | B2 | 12/2017 | Kiyokawa et al. |
| 9,875,655 | B2 | 1/2018 | Kiyokawa et al. |
| 10,031,227 | B2 | 7/2018 | Kiyokawa et al. |
| 10,150,486 | B2 | 12/2018 | Hoshino et al. |

(Continued)

FOREIGN PATENT DOCUMENTS

| | | |
|---|---|---|
| JP | 2012-217000 A | 11/2012 |
| JP | 2013-252854 A | 12/2013 |

(Continued)

*Primary Examiner* — Aniss Chad
*Assistant Examiner* — Christine Nguyen Huynh
(74) *Attorney, Agent, or Firm* — Sughrue Mion, PLLC

(57) ABSTRACT

A parking assist device includes a control device configured to execute automated parking control and a notification device. The automated parking control is control for assisting an operation of a target vehicle to park the target vehicle in a predetermined target parking spot while a driver of the target vehicle sits on a driver's seat of the target vehicle. The control device is configured to calculate a frontage of the target parking spot in advance before a start of execution of the automated parking control. The control device is configured to control the notification device, based on the calculated frontage, such that the notification device gives a notification about information related to a size of a drop-off space.

13 Claims, 9 Drawing Sheets

(56)                    References Cited

U.S. PATENT DOCUMENTS

| | | | |
|---|---|---|---|
| 10,239,520 B2 | 3/2019 | Tomozawa et al. | |
| 10,377,416 B2 | 8/2019 | Fukukawa et al. | |
| 2018/0178724 A1 | 6/2018 | Hatakeyama et al. | |
| 2019/0054927 A1* | 2/2019 | Hayakawa | G08G 1/14 |
| 2019/0302754 A1 | 10/2019 | Tsuruoka | |
| 2020/0226926 A1* | 7/2020 | Suzuki | G08G 1/143 |
| 2021/0070282 A1 | 3/2021 | Kim | |
| 2021/0179073 A1* | 6/2021 | Todor | B62D 15/0285 |
| 2022/0073056 A1* | 3/2022 | Hüger | G06V 20/586 |
| 2023/0365123 A1 | 11/2023 | Yamaguchi | |

FOREIGN PATENT DOCUMENTS

| | | | |
|---|---|---|---|
| JP | 2016-192772 A | 11/2016 | |
| JP | 2018-107754 A | 7/2018 | |
| JP | 2019-182038 A | 10/2019 | |
| JP | 2022-117815 A | 8/2022 | |
| WO | 2014/162753 A1 | 10/2014 | |

* cited by examiner

PARKING ASSIST DEVICE, CONTROL METHOD, AND NON-TRANSITORY STORAGE MEDIUM

CROSS-REFERENCE TO RELATED APPLICATION

This application claims priority to Japanese Patent Application No. 2022-195748 filed on Dec. 7, 2022, incorporated herein by reference in its entirety.

BACKGROUND

1. Technical Field

The present disclosure relates to a parking assist device, a control method, and a non-transitory storage medium.

2. Description of Related Art

Automated parking control is control for assisting an operation of a target vehicle to park the target vehicle in a predetermined target parking spot while a driver sits on a driver's seat of the target vehicle. Remote parking control is control for assisting an operation of the target vehicle to park the target vehicle in the target parking spot while the driver is outside the target vehicle. Japanese Unexamined Patent Application Publication No. 2013-252854 (JP 2013-252854 A) discloses a parking assist device, a control method, and a non-transitory storage medium capable of executing the automated parking control and the remote parking control.

The parking assist device disclosed in JP 2013-252854 A (hereinafter referred to as "related-art device") calculates a guidance route for moving a target vehicle to a target parking spot where the target vehicle is to be parked based on a current position of the target vehicle and a position of the target parking spot during execution of the automated parking control. The related-art device moves the target vehicle to the parking spot along the guidance route by the automated parking control while grasping a distance between the target vehicle and an obstacle around the target vehicle. When the target vehicle reaches the target parking spot, the related-art device determines whether the distance between the target vehicle and the obstacle is shorter than a distance threshold predetermined as a distance at which a sufficient drop-off space for the driver is secured. When the distance between the target vehicle and the obstacle is shorter than the distance threshold, the related-art device moves the target vehicle from the target parking spot by tracing the guidance route in reverse to a position where the distance between the target vehicle and the obstacle is equal to or longer than the distance threshold. When the target vehicle reaches the position where the distance between the target vehicle and the obstacle is equal to or longer than the distance threshold, the related-art device stops the target vehicle and waits until the driver drops off the target vehicle. When determination is made that the driver has dropped off the target vehicle, the related-art device moves the target vehicle again to the target parking spot along the guidance route by the remote parking control.

SUMMARY

According to the related-art device, when a sufficient drop-off space for the driver is not secured at the target parking spot, the target vehicle is repeatedly parked at the target parking spot. The operation of the target vehicle to park the target vehicle in the parking spot is complicated and a long period is required for the parking.

The present disclosure provides a parking assist device.

A first aspect of the present disclosure relates to a parking assist device. The parking assist device includes a control device configured to execute automated parking control, and a notification device configured to give a notification about predetermined information under control of the control device. The automated parking control is control for assisting an operation of a target vehicle to park the target vehicle in a predetermined target parking spot while a driver of the target vehicle sits on a driver's seat of the target vehicle. The control device is configured to calculate a frontage of the target parking spot in advance before a start of execution of the automated parking control. The control device is configured to control the notification device, based on the calculated frontage, such that the notification device gives a notification about information related to a size of a drop-off space for the driver in a case where the target vehicle is parked in the target parking spot by the automated parking control.

In the parking assist device according to the present disclosure, the driver of the target vehicle is notified about the information related to the size of the drop-off space by the notification device. Therefore, the driver can predict, before the start of the execution of the automated parking control, the size of the drop-off space for the driver in the case where the target vehicle is parked in the target parking spot by the automated parking control. For example, the driver of the target vehicle can recognize in advance before the start of the execution of the automated parking control that the drop-off space is narrow or wide in the case where the target vehicle is parked in the target parking spot by the automated parking control. Based on the information given from the notification device, the driver of the target vehicle can consider in advance whether to park the target vehicle in the target parking spot by the automated parking control, park the target vehicle in the target parking spot by a parking method other than the automated parking control, such as remote parking control, or search for a parking spot other than the target parking spot. By adopting a parking action based on the consideration result, it is possible to suppress repetition of the parking of the target vehicle due to finding that the drop-off space is narrow after the target vehicle is parked in the target parking spot. Thus, the period required for the parking can be shortened.

In the parking assist device according to the present disclosure, the control device calculates the frontage of the target parking spot. The frontage of the target parking spot is related to the size of the drop-off space for the driver to drop off the target vehicle parked in the target parking spot by the automated parking control. For example, when the frontage is narrow; it is considered that the drop-off space is narrow. When the frontage is wide, it is considered that the drop-off space is wide. By calculating the frontage of the target parking spot, the control device can control the notification device to give the notification about the information related to the size of the drop-off space based on the frontage. Since the frontage of the target parking spot is a side serving as the entrance for the target vehicle to enter the target parking spot among the sides defining the target parking spot, there is a strong possibility that the frontage is positioned near the target vehicle. Therefore, the frontage of the target parking spot can be calculated by the target vehicle before the start of the execution of the automated parking control. As a result, the driver can be notified about the information related to the size of the drop-off space for the driver before the start of the execution of the automated parking control.

The automated parking control executed by the control device of the parking assist device according to the present disclosure is control in which the parking assist device executes a part or whole of the operation of the target vehicle necessary for parking under the condition that the driver sits on the driver's seat of the target vehicle. Therefore, the parking assist device may control only a steering device of the target vehicle or control all the steering device, a drive device, a braking device, and a shift switching device during the execution of the automated parking control.

The parking assist device according to the first aspect of the present disclosure may include a surrounding informa- tion sensor configured to acquire information on objects or indications around the target vehicle. The control device may be configured to calculate the frontage based on the information acquired by the surrounding information sensor. When the target vehicle is positioned around the frontage of the target parking spot, the control device can calculate the frontage of the target parking spot relatively easily based on the information from the surrounding information sensor.

In the parking assist device according to the first aspect of the present disclosure, the control device may be configured to, when the calculated frontage satisfies a first condition, control the notification device such that the notification device gives the notification about the information related to the size of the drop-off space. The first condition may be a condition that holds when the drop-off space for the driver is narrow in the case where the target vehicle is parked in the target parking spot by the automated parking control. Since the notification device gives the notification about the infor- mation related to the size of the drop-off space, the driver of the target vehicle can recognize in advance that the drop-off space is narrow in the case where the target vehicle is parked in the target parking spot by the automated parking control.

In the parking assist device according to the first aspect of the present disclosure, the control device may be configured to, when the calculated frontage satisfies a first condition, control the notification device such that the notification device gives a notification about at least one of suggestion information and information indicating that the drop-off space is narrow. The suggestion information may be infor- mation for suggesting a parking method other than a parking method for parking the target vehicle in the target parking spot by executing the automated parking control. The first condition may be a condition that holds when the drop-off space for the driver is narrow in the case where the target vehicle is parked in the target parking spot by the automated parking control. Since the notification device gives the notification about the information indicating that the drop- off space is narrow; the driver of the target vehicle can recognize in advance that the drop-off space is narrow. Since the notification device gives the notification about the sug- gestion information for suggesting a parking method other than the method for parking in the target parking spot by the automated parking control, the driver of the target vehicle can consider the parking method for the target vehicle in advance based on the suggestion information.

In the parking assist device according to the first aspect of the present disclosure, the control device may be configured to, when the target parking spot is defined by two parallel parking mark lines, calculate a distance between the two parking mark lines as the frontage. Since the control device calculates the distance between the two parallel parking mark lines recognized by, for example, the surrounding information sensor and defining the target parking spot, the control device can calculate the frontage of the target parking spot relatively easily.

In the parking assist device according to the first aspect of the present disclosure, the control device may be configured to, when an adjacent parking spot is present, control the notification device such that the notification device does not give the notification about at least one of the suggestion information and the information indicating that the drop-off space is narrow. The adjacent parking spot may be a parking spot adjoining a driver's seat side of the target vehicle in the case where the target vehicle is parked in the target parking spot by the automated parking control. When the parking spot adjoining the driver's seat side of the target vehicle parked in the target parking spot is present, the door on the driver's seat side can be opened wide to enter the area within the adjacent parking spot even if the frontage of the target parking spot is narrow. Therefore, the drop-off space for the driver is wide. In such a case, the notification device does not give the notification about at least one of the information on the narrow drop-off space and the suggestion informa- tion. Thus, it is possible to suppress the notification about erroneous information.

In the parking assist device according to the first aspect of the present disclosure, the control device may be configured to execute remote parking control. The remote parking control may be control for assisting an operation of the target vehicle to park the target vehicle in the target parking spot while the driver is outside the target vehicle. The suggestion information may be remote parking suggestion information for suggesting a parking method for parking the target vehicle in the target parking spot by the remote parking control. Since the notification device gives the notification about the remote parking suggestion information, the driver of the target vehicle can consider in advance the parking method for parking the target vehicle in the target parking spot by the remote parking control.

In the parking assist device according to the first aspect of the present disclosure, the control device may be configured to control the notification device such that the notification device gives a notification about the remote parking sug- gestion information in response to satisfaction of a condition that the calculated frontage or a ratio of the calculated frontage to a width of the target vehicle is smaller than a predetermined threshold. When the frontage of the target parking spot is narrow; the notification device can appro- priately give the notification about the remote parking suggestion information.

A second aspect of the present disclosure relates to a control method to be executed by a computer of a parking assist device mounted on a target vehicle having an autono- mous driving function. The control method includes calcu- lating a frontage of a predetermined target parking spot in advance before a start of execution of automated parking control, giving a notification about information related to a size of a drop-off space for the driver in a case where the target vehicle is parked in the target parking spot by the automated parking control based on the calculated frontage, and executing the automated parking control. The automated parking control is control for assisting an operation of the target vehicle to park the target vehicle in the target parking spot while a driver of the target vehicle sits on a driver's seat of the target vehicle.

A third aspect of the present disclosure relates to a non-transitory storage medium storing instructions that are executable by one or more processors included in a com- puter of a parking assist device mounted on a target vehicle having an autonomous driving function and that cause the one or more processors to perform functions. The functions include calculating a frontage of a predetermined target parking spot in advance before a start of execution of automated parking control, giving a notification about information related to a size of a drop-off space for the driver in a case where the target vehicle is parked in the target parking spot by the automated parking control based on the calculated frontage, and executing the automated parking control. The automated parking control is control for assisting an operation of the target vehicle to park the target vehicle in the target parking spot while a driver of the target vehicle sits on a driver's seat of the target vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
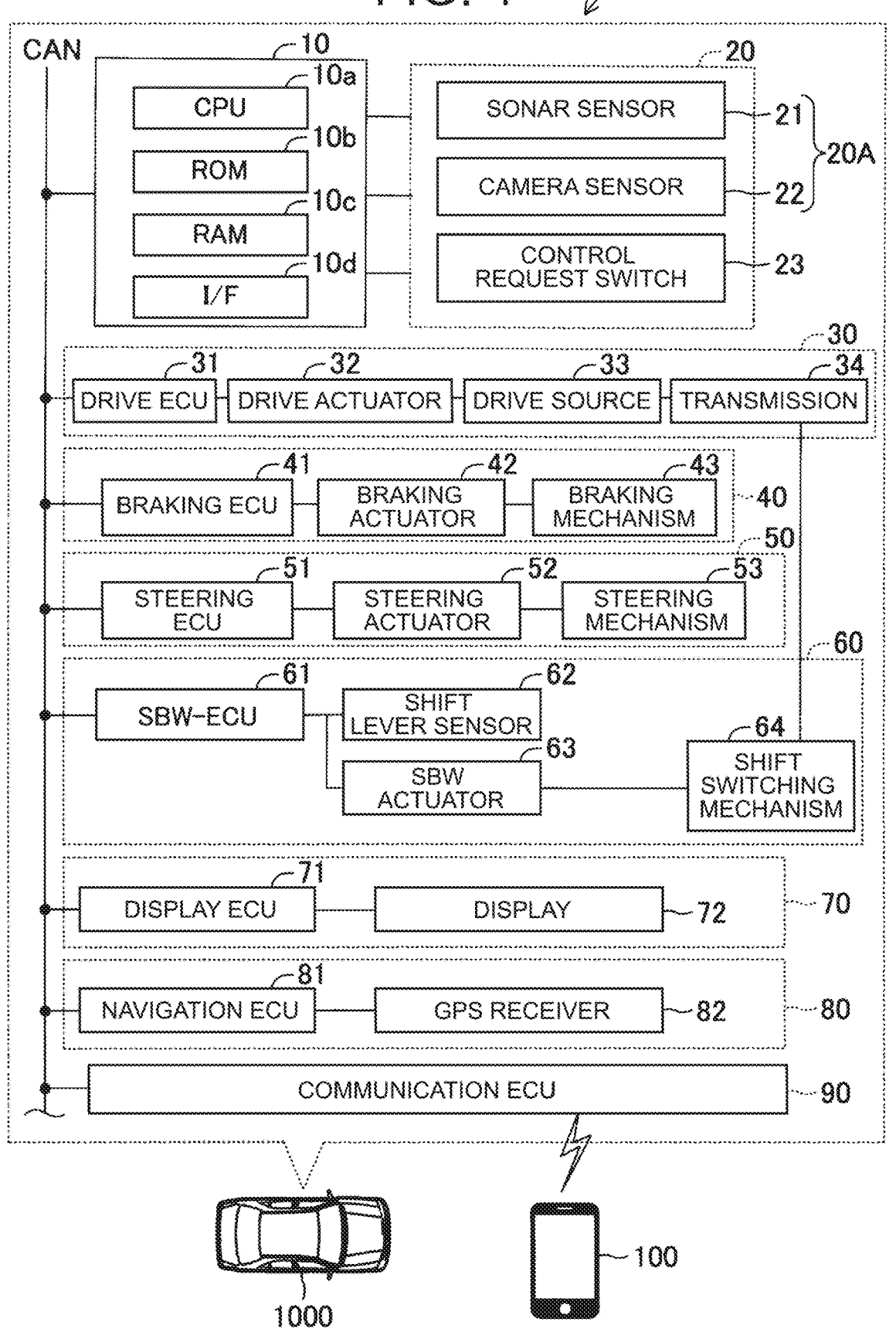
FIG. 1 is a block diagram of a parking assist device according to an embodiment of the present disclosure.

As shown in FIG. 1, a parking assist device 1 according to an embodiment of the present disclosure is mounted on a vehicle 1000 having an autonomous driving function. The vehicle 1000 may hereinafter be referred to as "target vehicle". That is, the parking assist device 1 is mounted on the target vehicle.

The parking assist device 1 includes a parking assist ECU 10, on-board sensors 20, a drive device 30, a braking device 40, a steering device 50, a shift switching device 60, a display device 70, a navigation device 80, and a communication ECU 90. The term "ECU" is an abbreviation of "electronic control unit".

The parking assist ECU 10 includes, as its main component, a microcomputer including a central processing unit (CPU) 10a, a read-only memory (ROM) 10b, a randomaccess memory (RAM) 10c, and an interface 10d. The parking assist ECU 10 is a control device configured such that various types of control including automated parking control and remote parking control can be executed by the CPU 10a executing instructions, programs, or routines stored in the ROM 10b. The ROM 10b is an example of a non-transitory storage medium. The parking assist ECU 10 is an example of a computer of the parking assist device. The automated parking control is control for assisting a movement operation of the target vehicle to park the target vehicle in a predetermined target parking spot while a driver of the target vehicle sits on a driver's seat of the target vehicle. The remote parking control is control for assisting a movement operation of the target vehicle to park the target vehicle in the target parking spot while the driver of the target vehicle is outside the target vehicle.

The parking assist ECU 10 may include a plurality of ECUs. The parking assist ECU 10 is connected to a plurality of other ECUs via a controller area network (CAN). For example, as shown in FIG. 1, the parking assist ECU 10 is connected to a drive ECU 31, a braking ECU 41, a steering ECU 51, an SBW-ECU 61, a display ECU 71, a navigation ECU 81, and a communication ECU 90. Necessary information can be exchanged with the connected ECUs.

The on-board sensors 20 include surrounding information sensors 20A that acquire information on objects or indications around the target vehicle. For example, the on-board sensors 20 include a sonar sensor 21 and a camera sensor 22 as the surrounding information sensors 20A.

The sonar sensor 21 intermittently radiates an ultrasonic wave in an area around the target vehicle, and receives an ultrasonic wave (reflected wave) reflected by a three-dimensional object (object). The sonar sensor 21 calculates, for example, a distance between the target vehicle and the object and a relative positional relationship between the target vehicle and the object based on a period from the transmission of the ultrasonic wave to the reception of the reflected wave. The sonar sensor 21 transmits information indicating the calculated distance and the calculated positional relationship to the parking assist ECU 10.

Figure 2:
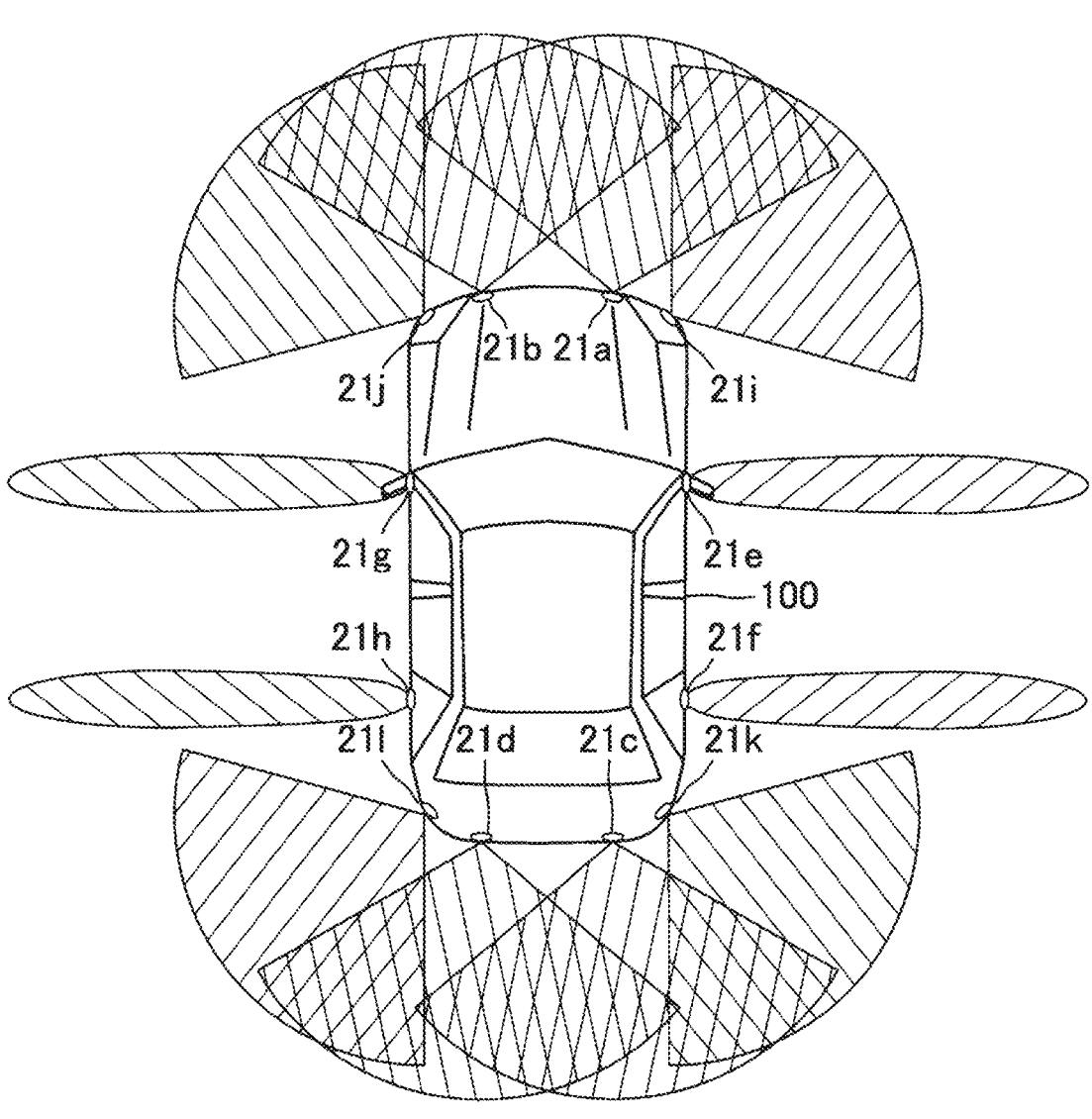
FIG. 2 shows an example of attachment positions of sonar sensors.

In the present embodiment, a plurality of sonar sensors 21 is provided on the target vehicle. The sonar sensors 21 are provided on the target vehicle to radiate ultrasonic waves almost all around the target vehicle. For example, as shown in FIG. 2, the sonar sensors 21 may include front sonar sensors 21a, 21b, rear sonar sensors 21c, 21d, right sonar sensors 21e, 21f, left sonar sensors 21g, 21h, a right front sonar sensor 21i, a left front sonar sensor 21j, a right rear sonar sensor 21k, and a left rear sonar sensor 21l. The front sonar sensors 21a and 21b radiate ultrasonic waves forward from rightward and leftward portions at the front end of the target vehicle, respectively. The rear sonar sensors 21c and 21d radiate ultrasonic waves rearward from rightward and leftward portions at the rear end of the target vehicle, respectively. The right sonar sensors 21e and 21f radiate ultrasonic waves rightward from forward and rearward portions at the right end of the target vehicle, respectively. The left sonar sensors 21g and 21h radiate ultrasonic waves leftward from forward and rearward portions at the left end of the target vehicle, respectively. The right front sonar sensor 21i radiates an ultrasonic wave obliquely forward to the right from the front right end of the target vehicle. The left front sonar sensor 21j radiates an ultrasonic wave obliquely forward to the left from the front left end of the target vehicle. The right rear sonar sensor 21k radiates an ultrasonic wave obliquely rearward to the right from the rear right end of the target vehicle. The left rear sonar sensor 21l radiates an ultrasonic wave obliquely rearward to the left from the rear left end of the target vehicle.

The camera sensor 22 includes camera devices and an image analysis device. The camera device is a digital camera including an imaging element such as a charge coupled device (CCD) or a complementary metal oxide semiconductor (CMOS) image sensor (CIS). Each camera device acquires image data by imaging an area around the target vehicle at a predetermined frame rate. The camera device transmits the image data to the image analysis device. The image analysis device analyzes the acquired image data to acquire information on an object and an indication around the target vehicle from the image. For example, the image analysis device recognizes the shape and color of a wall or fence of a parking spot and parking mark lines on a road surface, and transmits information indicating the recognition results to the parking assist ECU 10 together with the image data.

Figure 3:
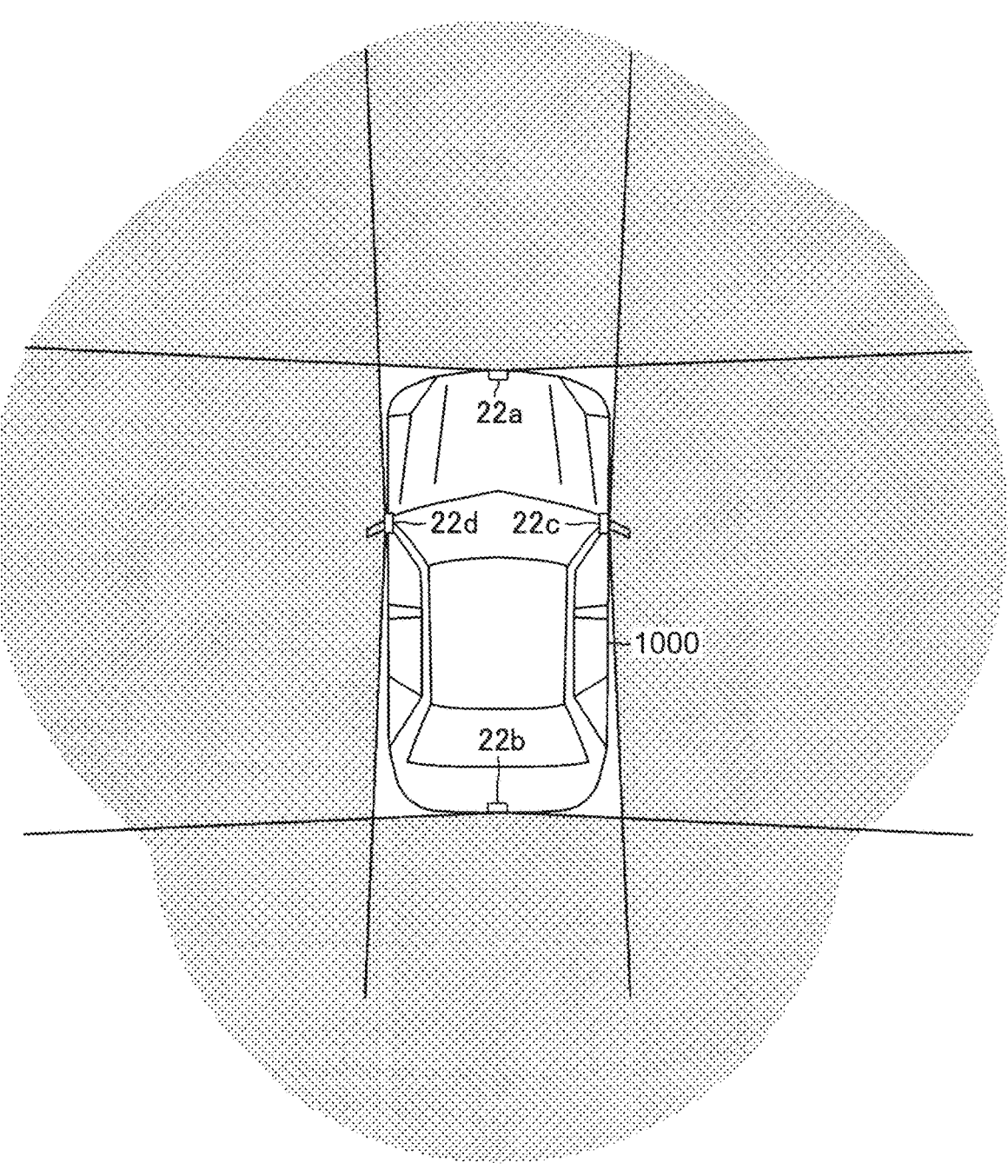
FIG. 3 shows an example of attachment positions of camera sensors.

The camera sensor 22 includes a plurality of camera devices to image the entire surroundings of the target vehicle. For example, as shown in FIG. 3, the camera devices include a front camera device 22a, a rear camera device 22b, a right side camera device 22c, and a left side camera device 22d. The front camera device 22a images an area ahead of the target vehicle. The rear camera device 22b images an area behind the target vehicle. The right side camera device 22c images a right side area from the target vehicle. The left side camera device 22d images a left side area from the target vehicle. The camera devices may include infrared camera devices to image the surroundings of the target vehicle even at night. One camera device may be a stereo camera or a camera device with a depth sensor so that a three-dimensional shape of an object can be recognized by the camera sensor 22.

The on-board sensors 20 may include radar sensors as the surrounding information sensors 20A. The radar sensor is configured to detect an object around the target vehicle by using a radio wave in a millimeter wave band. In this case, the radar sensors may include a front radar sensor that radiates a radio wave forward from the target vehicle, a rear radar sensor that radiates a radio wave rearward from the target vehicle, a right side radar sensor that radiates a radio wave to a right side from the target vehicle, and a left side radar sensor that radiates a radio wave to a left side from the target vehicle.

The on-board sensors 20 further include a control request switch 23. The control request switch 23 is an operation device for the driver to request parking of the target vehicle by using the parking assist device 1. The control request switch 23 is attached at a position in a vehicle cabin of the target vehicle where the driver can easily operate the control request switch 23. The control request switch 23 includes, for example, a normally open switch device of a push button type. The parking assist ECU 10 monitors an ON/OFF state of the control request switch 23.

The drive device 30 generates a driving force and applies the driving force to driving wheels of the target vehicle. The drive device 30 includes the drive ECU 31, a drive actuator 32, a drive source 33, a transmission 34, and a driving force transmission mechanism (not shown) that transmits the driving force to the driving wheels. The drive ECU 31 is electrically connected to the drive actuator 32 to control the operation of the drive actuator 32. The drive actuator 32 is operated to adjust the driving force of the drive source 33. The drive ECU 31 controls the driving force to be generated by the drive source 33 by controlling the operation of the drive actuator 32. The driving force generated by the drive source 33 is transmitted to the driving wheels of the target vehicle via the transmission 34 and the driving force transmission mechanism. Therefore, the drive ECU 31 can control the driving force of the target vehicle by controlling the drive actuator 32. The parking assist ECU 10 transmits a drive control signal including information indicating a target driving force to the drive ECU 31 during execution of the automated parking control or the remote parking control, thereby controlling the drive actuator 32 via the drive ECU 31 so that the driving force agrees with the target driving force. The drive device 30 can also generate the driving force when the driver operates an accelerator pedal provided in the target vehicle.

In a case where the drive source 33 is an internal combustion engine, the drive ECU 31 controls the driving force to be generated by the internal combustion engine. In a case where the target vehicle is a hybrid electric vehicle (HEV), the drive ECU 31 controls the driving force to be generated by either one or both of an internal combustion engine and an electric motor serving as the drive source 33. In a case where the target vehicle is a battery electric vehicle (BEV), the drive ECU 31 controls the driving force to be generated by an electric motor serving as the drive source 33.

The braking device 40 applies a braking force to the wheels of the target vehicle. The braking device 40 includes the braking ECU 41, a braking actuator 42, and a braking mechanism 43. The braking ECU 41 is electrically connected to the braking actuator 42 to control the operation of the braking actuator 42. The braking actuator 42 includes a known hydraulic circuit, including a reservoir, an oil pump, and various valve devices (not shown). The braking mechanism 43 includes brake discs, calipers, pistons, and brake pads, and generates frictional braking forces by pressing the brake pads against the brake discs with hydraulic pressures (that is, braking pressures) supplied from the braking actuator 42. The target vehicle is braked by the frictional braking forces generated by the braking mechanism 43.

The braking actuator 42 adjusts the hydraulic pressures (braking pressures) to be supplied to the braking mechanism 43 in response to an instruction from the braking ECU 41. The frictional braking forces generated on the wheels change depending on the braking pressures. Therefore, the braking ECU 41 can control the braking force of the target vehicle by controlling the braking actuator 42. The parking assist ECU 10 transmits a braking control signal including information indicating a target braking force to the braking ECU 41 during execution of the automated parking control or the remote parking control, thereby controlling the braking actuator 42 via the braking ECU 41 so that the braking force agrees with the target braking force. The braking device 40 can also apply the braking force to the wheels of the target vehicle when the driver operates a brake pedal provided in the target vehicle.

The steering device 50 steers the target vehicle. The steering device 50 includes the steering ECU 51, a steering actuator 52, and a steering mechanism 53. The steering ECU 51 is electrically connected to the steering actuator 52 to control the operation of the steering actuator 52. The steering mechanism 53 includes a steering wheel, a steering shaft, a steering gear box, tie rods, and the like. The steering mechanism 53 is configured to steer the steered wheels by rotating the steering wheel. The steering actuator 52 is, for example, an electric motor, and is connected to the steering mechanism 53 to apply power for steering the steered wheels to the steering mechanism 53. The steering actuator 52 is also configured to generate a steering assist force for assisting the driver's operation on the steering wheel. The steering ECU 51 controls the operation of the steering mechanism 53 by controlling the operation of the steering actuator 52. Therefore, the steering ECU 51 can control a steering angle of the steered wheels of the target vehicle by controlling the steering actuator 52. The parking assist ECU 10 transmits a steering control signal including information indicating a target steering angle to the steering ECU 51 during execution of the automated parking control or the remote parking control, thereby controlling the steering actuator 52 via the steering ECU 51 so that the steering angle of the steered wheels agrees with the target steering angle.

The shift switching device 60 switches shift positions (shift stages) of the transmission 34. In this example, the shift positions include at least a parking position, a neutral position, a forward position, and a reverse position. When the shift position is the parking position, the shift switching device 60 mechanically locks the wheels so that the driving force is not transmitted to the driving wheels and the wheels cannot rotate. Specifically, when the shift position is the parking position, an output shaft of the transmission 34 is locked so as not to rotate. Such a state is also referred to as "parking lock (P-lock) state". When the shift position is the neutral position, the shift switching device 60 does not transmit the driving force to the driving wheels. When the shift position is the neutral position, the shift switching device 60 does not mechanically lock the wheels. When the shift position is the forward position, the shift switching device 60 transmits a driving force for causing the vehicle to move forward to the driving wheels. When the shift position is the reverse position, the shift switching device 60 transmits a driving force for causing the vehicle to move rearward to the driving wheels.

The shift switching device 60 includes the SBW-ECU 61, a shift lever sensor 62, an SBW actuator 63, a shift switching mechanism 64, and the like. The term "SBW" is an abbreviation of "shift-by-wire". The SBW-ECU 61 is connected to the shift lever sensor 62 and the SBW actuator 63. The shift lever sensor 62 detects the position of a shift lever. The SBW-ECU 61 receives the position of the shift lever from the shift lever sensor 62 and controls the SBW actuator 63 based on the shift lever position. The SBW actuator 63 operates the shift switching mechanism 64 in response to an instruction from the SBW-ECU 61 to switch the shift position of the transmission 34 to one of the plurality of shift positions (parking position, neutral position, forward position, and reverse position). The parking assist ECU 10 transmits a shift control signal including information indicating a target shift position to the SBW-ECU 61 during execution of the automated parking control or the remote parking control, thereby controlling the SBW actuator 63 via the SBW-ECU 61 so that the shift position agrees with the target shift position.

The display device 70 includes the display ECU 71 and a display 72. The display ECU 71 is connected to the display 72 to control the display 72. Examples of the display 72 include a multi-information display attached to an instrument panel provided in front of the driver's seat of the target vehicle. The parking assist ECU 10 transmits a predetermined display control signal to the display ECU 71 to control the display device 70 so that predetermined image information is displayed on the display 72. The display device 70 is an example of a notification device. Examples of the notification device include, in addition to or instead of the display device 70, a voice output device or a sound output device that generates voice or sound.

The navigation device 80 includes the navigation ECU 81 and a global positioning system (GPS) receiver 82. The GPS receiver 82 receives GPS signals for detecting the latitude and longitude of a current position of the target vehicle. The navigation device 80 includes a map database that stores map information. The navigation ECU 81 determines a position of the target vehicle on a map by executing various arithmetic processes based on, for example, the latitude and longitude of the target vehicle obtained from the GPS signals received by the GPS receiver 82, and the map information. The determined position of the target vehicle is transmitted to the parking assist ECU 10 and used for the automated parking control or the remote parking control.

The communication ECU 90 includes a communication device. The communication ECU 90 is configured to transmit and receive a signal indicating predetermined information to and from an external communication device such as a smartphone 100 by wireless communication. A remote parking application to be used when parking the target vehicle by the remote parking control is installed in the smartphone 100 as an application that implements functions related to the parking assist device 1 according to the present disclosure. When a user of the smartphone 100, such as the driver of the target vehicle, parks the target vehicle by the remote parking control, the user activates the remote parking application outside the target vehicle and performs a predetermined operation. Thus, a remote control permission signal is issued from the smartphone 100. The remote control permission signal is received by the communication ECU 90.

When parking the target vehicle by using the parking assist device 1 having the above configuration, the driver moves the target vehicle to the vicinity of a predetermined target parking spot. Next, the driver temporarily stops the target vehicle at a position near the target parking spot. The temporary stop position is preferably a position where the sonar sensor 21 and the camera sensor 22 of the target vehicle can acquire information on the target parking spot and its periphery.

Figure 4:
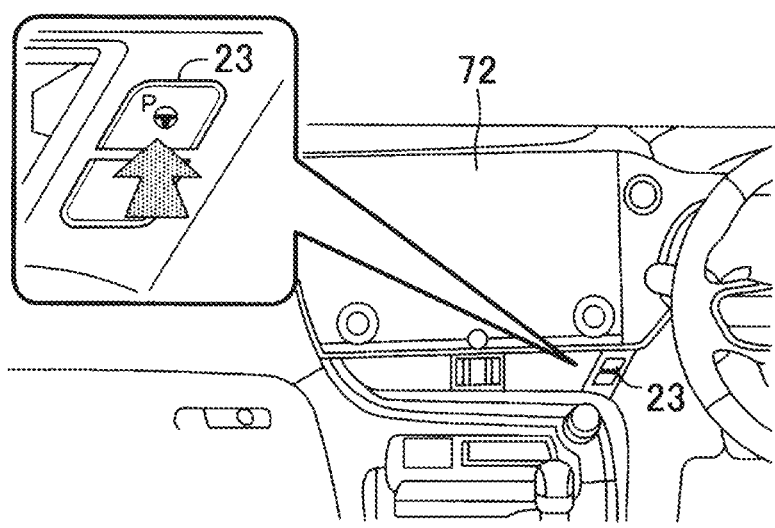
FIG. 4 shows an example of a disposition position of a control request switch.

After the target vehicle is temporarily stopped at a predetermined position near the target parking spot, the driver pushes the control request switch 23. For example, as shown in FIG. 4, the control request switch 23 is provided below the display 72 embedded in the instrument panel provided in the vehicle cabin of the target vehicle.

When the parking assist ECU 10 detects that the control request switch 23 has been pushed, the parking assist ECU 10 determines that the driver intends to park the target vehicle in the target parking spot. Then, the parking assist ECU 10 executes an available parking area detection process. In the available parking area detection process, the parking assist ECU 10 acquires information on an object around the target vehicle as object information based on information acquired from the sonar sensor 21 and the camera sensor 22. The parking assist ECU 10 plots the object information on a two-dimensional map. The two-dimensional map is, for example, a planar map in which the origin is a central position G of the target vehicle, an X axis extends from the origin in a longitudinal direction of the target vehicle, and a Y axis extends from the origin in a width direction of the target vehicle. The central position G of the target vehicle is an intersection of an axis passing through the center of the target vehicle in the width direction among axes parallel to the longitudinal direction of the target vehicle and an axis passing through the center of the target vehicle in the longitudinal direction among axes parallel to the width direction of the target vehicle. The object identified based on the object information depicted on the two-dimensional map is recognized by the parking assist ECU 10 as a three-dimensional object.

The parking assist ECU 10 acquires indication information on an area around the target vehicle based on image data acquired from the camera sensor 22, and detects parking mark lines on a road surface in the area around the target vehicle based on the acquired indication information. The parking assist ECU 10 depicts the detected parking mark lines on the two-dimensional map. The parking mark lines depicted on the two-dimensional map are recognized by the parking assist ECU 10 as a non-three-dimensional object.

The parking assist ECU 10 detects an "object-free area" around the target vehicle based on the object information shown on the two-dimensional map and the information on the parking mark lines on the road surface. When the object-free area has a size and shape in which the target vehicle can be parked, the parking assist ECU 10 determines this area as an available parking area. For example, the available parking area is an area between two parking mark lines or between two objects, and is an area that has no object and can include the planar shape of the target vehicle.

Figure 5:
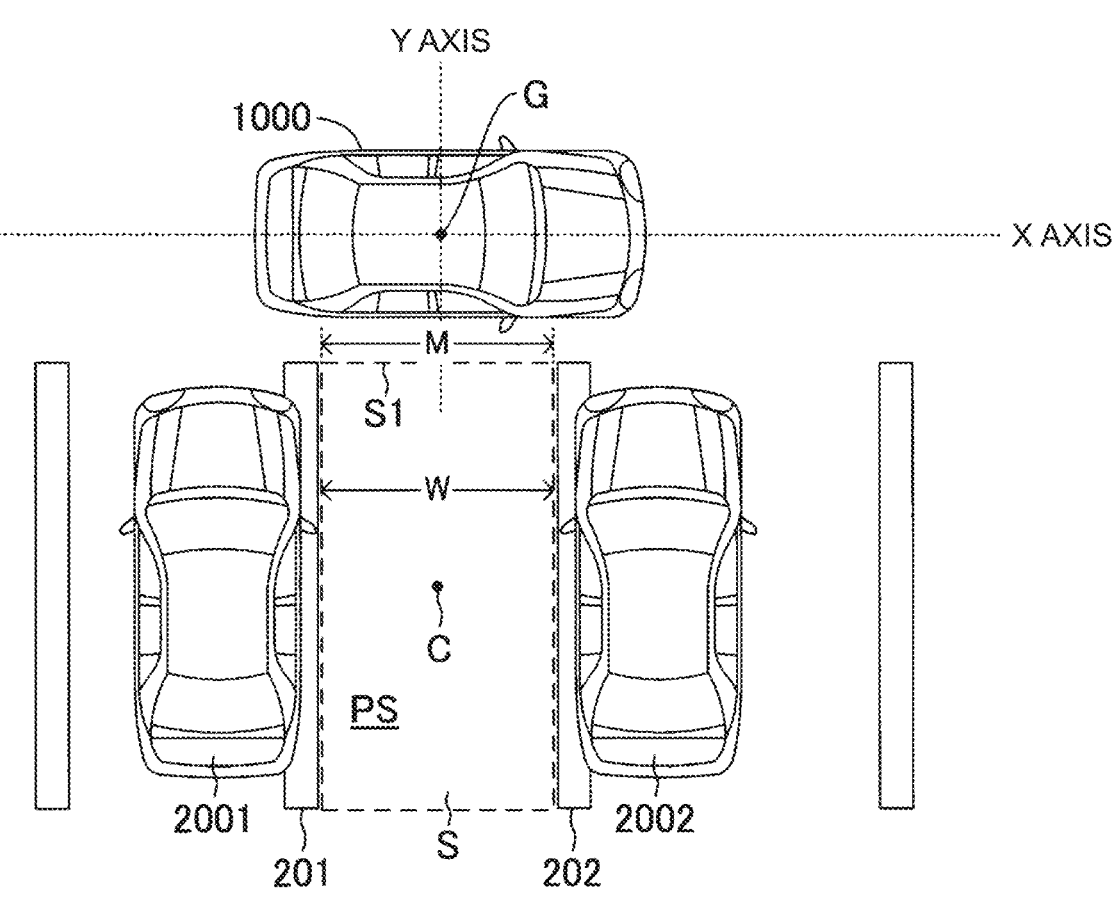
FIG. 5 is an example of a plan view represented by a two-dimensional map.

FIG. 5 is an example of a plan view represented by the two-dimensional map. As shown in FIG. 5, the target vehicle (vehicle 1000) temporarily stops in front of a space occupied by an object-free area S between two parallel parking mark lines 201, 202. Other vehicles 2001, 2002 are parked to adjoin both sides of the space. When such a two-dimensional map is depicted, the parking assist ECU 10 detects the area S between the two parking mark lines 201, 202 as the object-free area around the target vehicle. The parking assist ECU 10 detects, as the available parking area, an area having a size and shape in which the target vehicle can be parked in the object-free area around the target vehicle.

After the available parking area is detected by executing the available parking area detection process, the parking assist ECU 10 sets a target parking spot. When only one available parking area is detected by executing the available parking area detection process, this available parking area is set as the target parking spot. When a plurality of available parking areas is detected by executing the available parking area detection process, one of the available parking areas is set as the target parking spot. In this case, the set target parking spot may be changeable.

Next, the parking assist ECU 10 executes a frontage calculation process. A frontage M of the target parking spot is calculated by executing the frontage calculation process. The frontage of the target parking spot is herein the width of a side serving as the entrance for the vehicle among the sides defining the parking spot. For example, when a target parking spot PS is the rectangular area S defined by the two parking mark lines as shown in FIG. 5, the frontage M of the target parking spot PS is a length of a short side S1 near the target vehicle out of two parallel short sides defining the area S. The length of the short side S1 is a distance between the two parking mark lines. The parking assist ECU 10 can recognize the two parking mark lines defining the target parking spot based on the information acquired from the camera sensor 22 that is the surrounding information sensor 20A provided on the target vehicle. Therefore, the frontage M can be calculated based on the information on the parking mark lines acquired from the camera sensor 22. For example, the parking assist ECU 10 can calculate the frontage M of the target parking spot based on coordinate values of the two parking mark lines depicted on the two-dimensional map. When the target parking spot is defined by the two parking mark lines, the frontage M of the target parking spot is equal to a width W of the target parking spot.

After the frontage M of the target parking spot is calculated by executing the frontage calculation process, the parking assist ECU 10 determines whether the calculated frontage M satisfies a condition that holds when the drop-off space for the driver is narrow in a case where the target vehicle is parked in the target parking spot by the automated parking control. The drop-off space for the driver can be regarded as the volume of a space that the driver can occupy when dropping off the target vehicle. Therefore, the drop-off space is narrow when the opening amount of a door on the driver's seat side is small while dropping off the vehicle, and the drop-off space is wide when the opening amount is large. Examples of the condition that holds when the drop-off space is narrow include a condition that the frontage M is smaller than a predetermined distance threshold Mth.

Figure 6:
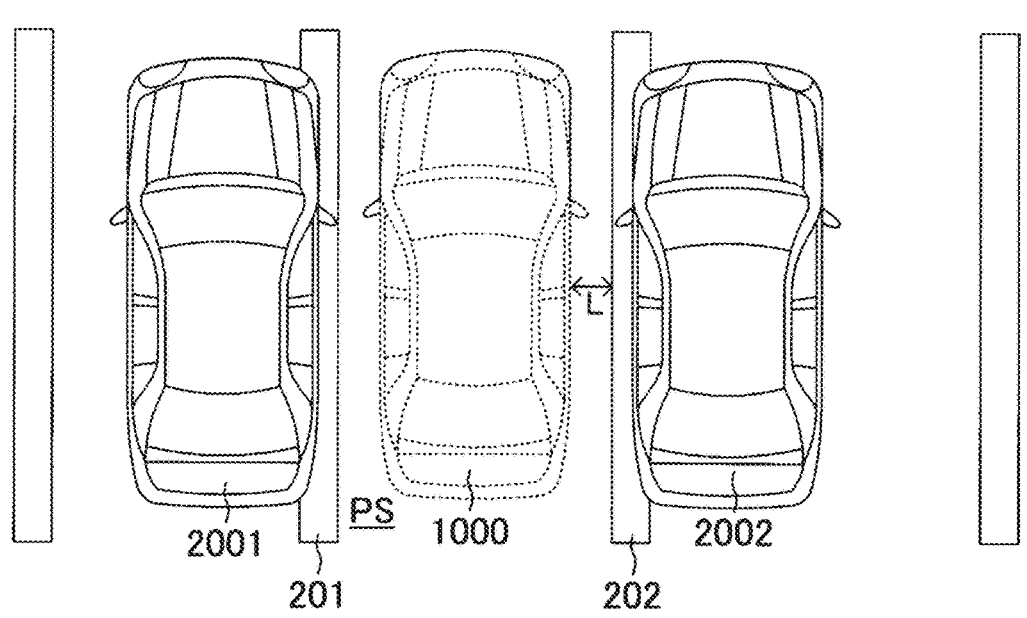
FIG. 6 shows a two-dimensional map depicting a target vehicle parked in a target parking spot by automated parking control.

For example, when the width of the target vehicle is 1.7 m and the calculated frontage M of the target parking spot is 2.5 m, the length obtained by subtracting the width of the target vehicle from the frontage M is 80 cm. When the target vehicle is parked in the target parking spot by the automated parking control, the target vehicle enters the target parking spot through the frontage M, and is parked in the target parking spot so that the front end face or the rear end face of the target vehicle faces the frontage M of the target parking spot and the width direction of the target vehicle substantially agrees with the width direction of the target parking spot. FIG. 6 shows, with dashed lines, the target vehicle parked in the target parking spot PS by the automated parking control in the two-dimensional map shown in FIG. 5. As shown in FIG. 6, the target vehicle (vehicle 1000) is parked substantially at the central position of the target parking spot PS in the width direction ("W" direction in FIG. 5). At this time, the target vehicle is parked at the center of the target parking spot so that a free space on the right side of the target vehicle and a free space on the left side of the target vehicle in the target parking spot are substantially equal to each other. Assuming that the frontage M of the target parking spot is the same as the width of the target parking spot, the length of the free space in the vehicle width direction on the driver's seat side of the target vehicle in the target parking spot is 40 cm. When the driver's seat of the target vehicle is a right front seat, the length of the free space in the vehicle width direction on the driver's seat side of the target vehicle is represented by a distance L in FIG. 6. When the door on the driver's seat side of the target vehicle parked in the target parking spot is opened to project beyond the target parking spot, the door on the driver's seat side of the target vehicle may come into contact with an object adjoining the target parking spot or another vehicle parked to adjoin the target parking spot. To suppress such contact, the door on the driver's seat side of the target vehicle is opened within the target parking spot. In the above example, the maximum value of the opening amount of the door on the driver's seat side of the target vehicle in the vehicle width direction is 40 cm. When the maximum value of the opening amount of the door in the vehicle width direction is 40 cm, it is considered that the drop-off space for the driver is narrow. That is, when the frontage M is 2.5 m, determination can be made that the drop-off space is narrow.

When the width of the target vehicle is 2.0 m and the calculated frontage M of the target parking spot is 4.0 m, the length obtained by subtracting the width of the target vehicle from the frontage M is 2.0 m. When the target vehicle is parked in the target parking spot by the automated parking control in this case, the length of the free space in the vehicle width direction on the driver's seat side of the target vehicle in the target parking spot is 1.0 m. When the door on the driver's seat side of the target vehicle is opened in the target parking spot, the maximum value of the opening amount of the door on the driver's seat side of the target vehicle in the vehicle width direction is 1.0 m. When the maximum value of the opening amount of the door in the vehicle width direction is 1.0 m, it is considered that the drop-off space for the driver is wide. That is, when the frontage M is 4.0 m, determination can be made that the drop-off space is wide.

As described above, the frontage M of the target parking spot is related to the size of the drop-off space for the driver in the case where the target vehicle is parked in the target parking spot by the automated parking control. There is a tendency that the drop-off space for the driver is narrower as the frontage M of the target parking spot is smaller. Therefore, the condition that the frontage M of the target parking spot is smaller than the predetermined distance threshold Mth is a condition that holds when the drop-off space for the driver is narrow in the case where the target vehicle is parked in the target parking spot by the automated parking control (condition indicating that the drop-off space is narrow). That is, the parking assist ECU 10 can determine whether the drop-off space for the driver is narrow in the case where the target vehicle is parked in the target parking spot by the automated parking control based on whether the calculated frontage M is smaller than the distance threshold Mth.

In a case where the width of the target vehicle is small, the drop-off space may be wide even if the frontage M of the target parking spot is relatively small. In this case, the distance threshold Mth can be set relatively small. In a case where the width of the target vehicle is large, the drop-off space may be narrow even if the frontage M is relatively large. In this case, the distance threshold Mth needs to be set sufficiently large. Thus, it is preferable to set the distance threshold Mth based on the width of the target vehicle. For example, the distance threshold Mth can be set to increase as the width of the target vehicle increases.

The condition that holds when the drop-off space is narrow may be, for example, a condition that a ratio B of the calculated frontage M to the width of the target vehicle, that is, a value obtained by dividing the calculated frontage M by the width of the target vehicle is smaller than a predetermined ratio threshold Bth. In this case, the parking assist ECU 10 can determine whether the drop-off space for the driver is narrow in the case where the target vehicle is parked in the target parking spot by the automated parking control based on whether the ratio B is smaller than the predetermined ratio threshold Bth. The ratio threshold Bth can be set, for example, to a value in a range of 1.5 or larger and 2.0 or smaller.

When the calculated frontage M or the ratio B of the frontage M to the width of the target vehicle is equal to or larger than the predetermined threshold (distance threshold Mth or ratio threshold Bth), the condition that holds when the drop-off space for the driver is narrow is not satisfied. In this case, the parking assist ECU 10 determines that the drop-off space is wide. When the calculated frontage M or the ratio B is smaller than the predetermined threshold (distance threshold Mth or ratio threshold Bth), the condition that holds when the drop-off space for the driver is narrow is satisfied. In this case, the parking assist ECU 10 determines that the drop-off space is narrow.

The parking assist ECU 10 executes a first display process when determination is made that the drop-off space is wide. In the first display process, the parking assist ECU 10 generates peripheral image information by using image data acquired from the camera sensor 22. The image generated based on the peripheral image information is referred to as "peripheral image". The peripheral image is an image corresponding to at least a partial range of an area around the target vehicle, and includes a camera viewpoint image and a virtual viewpoint image.

The camera viewpoint image is an image whose initial point is a disposition position of a lens of each of the camera devices. The virtual viewpoint image shows the target vehicle and the surroundings of the target vehicle that are viewed from a virtual viewpoint set at an arbitrary position around the target vehicle. Methods for generating the virtual viewpoint image are known (see, for example, Japanese Unexamined Patent Application Publication Nos. 2012-217000 (JP 2012-217000 A), 2016-192772 (JP 2016-192772 A), and 2018-107754 (JP 2018-107754 A)).

Figure 7:
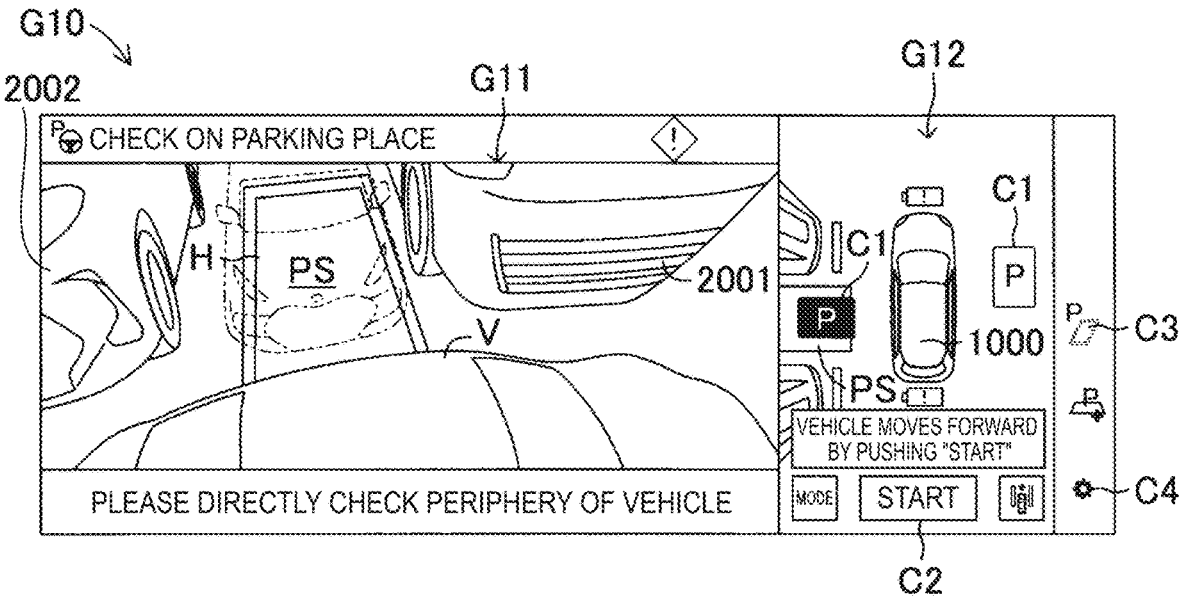
FIG. 7 shows an example of a first peripheral display image displayed on a display.

The parking assist ECU 10 controls the display device 70 so that a predetermined peripheral image among the generated peripheral images is displayed on the display 72. Thus, a first peripheral display image is displayed on the display 72. The first peripheral display image is displayed to start execution of the automated parking control. FIG. 7 shows an example of the first peripheral display image displayed on the display 72. As shown in FIG. 7, a first peripheral display image G10 includes a first viewpoint image G11 and a second viewpoint image G12. The first viewpoint image G11 is displayed in a left area of the first peripheral display image G10, and the second viewpoint image G12 is displayed in a right area of the first peripheral display image G10.

The first viewpoint image G11 is a virtual viewpoint image of the target parking spot PS viewed from slightly above the temporary stop position of the target vehicle. The first viewpoint image G11 includes an image of the periphery of the target parking spot PS. For example, as shown in FIG. 7, the first viewpoint image G11 shows a part of the other vehicles 2001, 2002 parked on both sides of the target parking spot PS. The first viewpoint image G11 also includes an image V showing a part of the target vehicle at the temporary stop position of the target vehicle. The first viewpoint image G11 may include an image H showing the target vehicle to be parked in a predetermined area of the target parking spot PS.

The second viewpoint image G12 is a virtual viewpoint image of an area around the target vehicle that includes the target parking spot PS and is viewed from directly above the target vehicle. As shown in FIG. 7, the second viewpoint image G12 shows, for example, the target vehicle (vehicle 1000), a part of the target parking spot PS, and the other vehicles adjoining the target parking spot PS. The second viewpoint image G12 shows parking position indication symbols C1 represented by "P". An area indicated by the parking position indication symbol C1 is an available parking area. When there is one available parking area indicated by the parking position indication symbol C1, the available parking area indicated by the parking position indication symbol C1 is the target parking spot PS. When there is a plurality of available parking areas indicated by the parking position indication symbols C1, one of the available parking areas indicated by the parking position indication symbols C1 is the target parking spot PS. The parking position indication symbol C1 associated with the target parking spot PS is displayed in a display format different from that of the parking position indication symbol C1 associated with the available parking area that is not the target parking spot PS. For example, the background color of the parking position indication symbol C1 associated with the target parking spot PS is blue, and the background color of the parking position indication symbol C1 associated with the available parking area that is not the target parking spot PS is white.

A control start icon C2 is displayed in a lower area of the second viewpoint image G12. A control start signal for the automated parking control is transmitted from the display ECU 71 to the parking assist ECU 10 by tapping the control start icon C2. A remote parking icon C3, a setting icon C4, and the like are displayed in a right area of the second viewpoint image G12.

Figure 8:
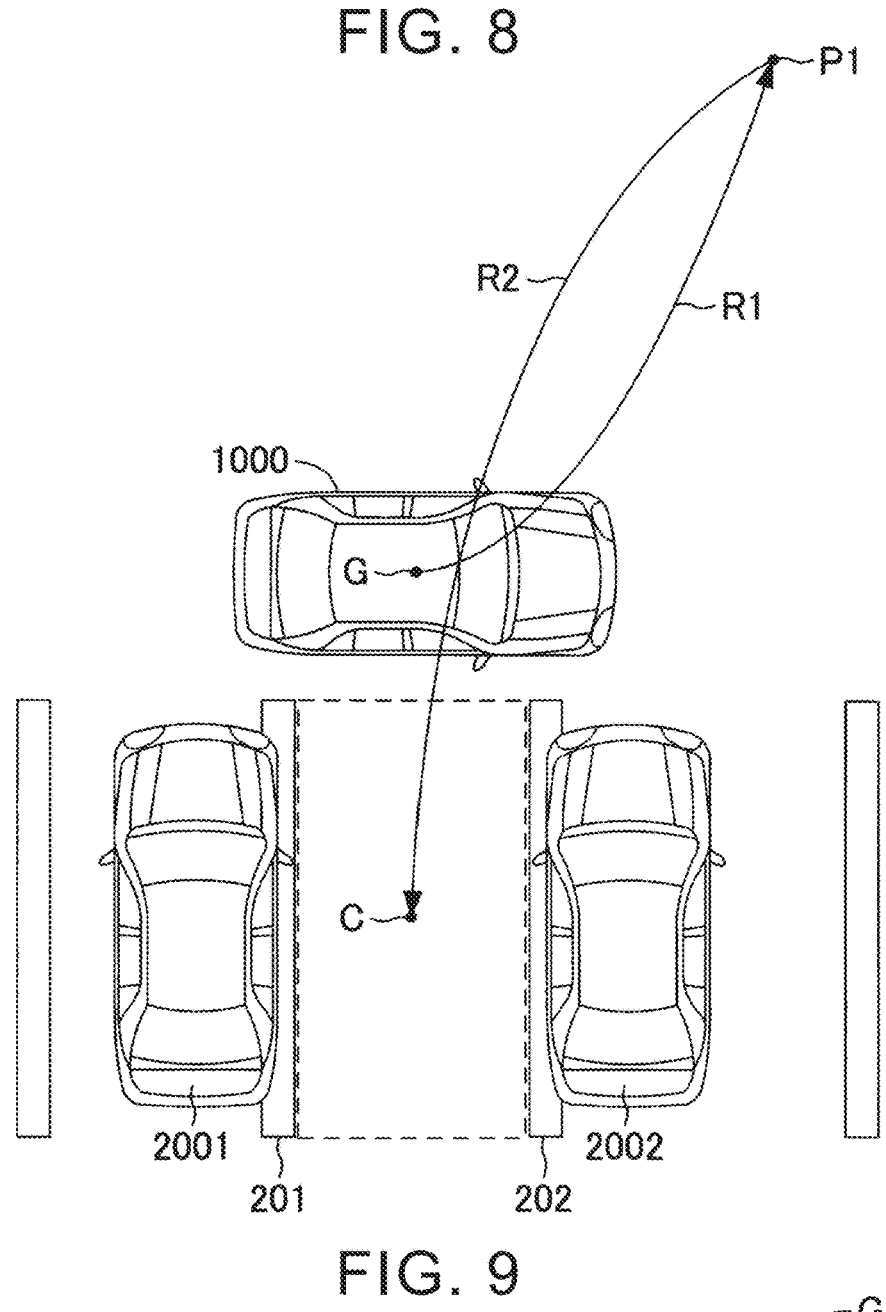
FIG. 8 shows a forward route and a reverse route as guidance routes.

When the control start signal for the automated parking control is transmitted to the parking assist ECU 10 by tapping the control start icon C2, the parking assist ECU 10 starts executing the automated parking control. When the execution of the automated parking control is started, the parking assist ECU 10 calculates a guidance route along which the central position G of the target vehicle at the temporary stop position will move to a predetermined target parking position C within the target parking spot PS and the target vehicle will stop at that position in a predetermined direction. The guidance route is calculated based on a preset parking mode. For example, in a reverse perpendicular parking mode in which the target vehicle is parked perpendicularly by moving in reverse, the parking assist ECU 10 calculates a forward route R1 and a reverse route R2 as shown in FIG. 8. The forward route R1 is a route along which the target vehicle moves forward from the temporary stop position and the central position G of the target vehicle moves to a turnaround point P1. The reverse route is a route along which the target vehicle moves in reverse from the turnaround point P1 and the central position G of the target vehicle moves to the target parking position C within the target parking spot PS.

The guidance route is calculated so that the target vehicle moves from the temporary stop position to a predetermined parking area within the target parking spot PS without contact with an object. For example, the guidance route is calculated as a route along which the target vehicle can move from the temporary stop position to the predetermined parking area within the target parking spot PS while maintaining a predetermined distance between the target vehicle and an object such as a fence or an adjacent vehicle.

After the guidance route is calculated, the parking assist ECU 10 determines a movement direction of the target vehicle (specifically, a target shift position of the transmission 34), a steering angle pattern, and a speed pattern to move the target vehicle along the guidance route.

When the movement direction of the target vehicle is determined, the parking assist ECU 10 transmits a shift control signal including information indicating the determined target shift position to the SBW-ECU 61 via the CAN. When the shift control signal is received from the parking assist ECU 10, the SBW-ECU 61 drives the SBW actuator 63 to operate the shift switching mechanism 64 so that the shift position of the transmission 34 is changed to the target shift position specified by the shift control signal.

The steering angle pattern is data in which the central position G of the target vehicle on the guidance route is associated with the steering angle, and is a pattern of change in the target steering angle when the central position G of the target vehicle moves along the guidance route. When the steering angle pattern is determined, the parking assist ECU 10 transmits a steering control signal including information indicating the target steering angle to the steering ECU 51 via the CAN based on the determined steering angle pattern. When the steering control signal is received from the parking assist ECU 10, the steering ECU 51 drives the steering actuator 52 so that the steering angle of the target vehicle agrees with the target steering angle associated with the central position G of the target vehicle on the guidance route.

The speed pattern is data in which the central position G of the target vehicle on the guidance route is associated with the traveling speed, and is a pattern of change in the target vehicle speed when the central position G of the target vehicle moves along the guidance route. The speed pattern is set so that the vehicle speed agrees with a predetermined final target vehicle speed when the central position G of the target vehicle reaches the target parking position C. The final target vehicle speed may be zero. When the speed pattern is determined, the parking assist ECU 10 transmits, via the CAN, a drive control signal including information indicating a target driving force to the drive ECU 31 and a braking control signal including information indicating a target braking force to the braking ECU 41 so that the speed of the target vehicle agrees with the target vehicle speed associated with the central position G of the target vehicle on the guidance route. When the drive control signal is received from the parking assist ECU 10, the drive ECU 31 controls the drive actuator 32 so that the driving force of the drive source 33 agrees with the target driving force. When the braking control signal is received from the parking assist ECU 10, the braking ECU 41 controls the braking actuator 42 so that the braking force agrees with the target braking force.

When the parking assist ECU 10 transmits the control signals to the ECUs as described above, the drive device 30, the braking device 40, the steering device 50, and the shift switching device 60 are controlled so that the target vehicle moves along the guidance route. Thus, the parking assist device 1 assists the movement operation of the target vehicle to park the target vehicle in the target parking spot PS. At this time, the driver sits on the driver's seat of the target vehicle. Therefore, the driver in the target vehicle also moves along the guidance route. When the central position G of the target vehicle reaches the target parking position C within the target parking spot PS, the parking assist ECU 10 executes a termination process. In the termination process, the parking assist ECU 10 operates the SBW actuator 63 so that the shift position of the target vehicle becomes the parking position. As a result, the parking lock is achieved for the target vehicle. In the termination process, the parking assist ECU 10 controls the display device 70 or the voice output device so that the display 72 displays information indicating completion of the parking of the target vehicle or so that the voice output device outputs voice guidance indicating the completion of the parking of the target vehicle. After the termination process is executed, the parking assist ECU 10 terminates the automated parking control.

When a predetermined termination condition is satisfied during the execution of the automated parking control, the parking assist ECU 10 terminates the execution of the automated parking control. Specifically, the termination condition is satisfied when the driver starts to operate one or more of the accelerator pedal, the brake pedal, the steering wheel, and the shift lever of the target vehicle during the execution of the automated parking control.

When the automated parking control is terminated with the termination condition unsatisfied, the driver drops off the target vehicle parked in the predetermined area within the target parking spot PS. Since the frontage M calculated by executing the frontage calculation process or the ratio B of the frontage M to the width of the target vehicle is equal to or larger than the threshold, determination is made that the drop-off space for the driver is wide. Therefore, the driver who has parked the target vehicle in the target parking spot PS can open the door on the driver's seat side without contact with another adjacent vehicle and drop off the target vehicle with a margin of space.

Figure 9:
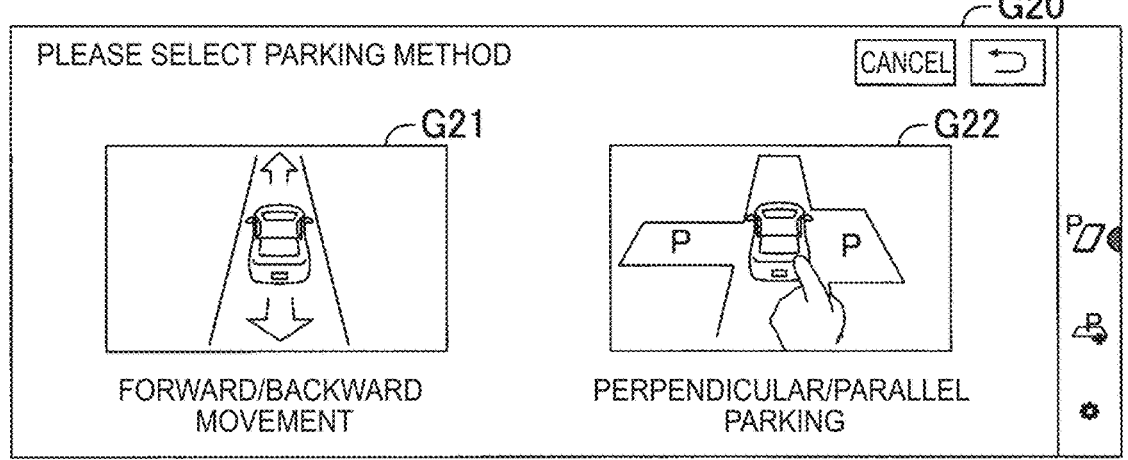
FIG. 9 shows an example of a mode setting image displayed on the display.

The automated parking control is executed by tapping the control start icon C2 in the first peripheral display image G10. When the remote parking icon C3 in the first peripheral display image G10 is tapped without tapping the control start icon C2, the display ECU 71 transmits a remote parking request signal to the parking assist ECU 10. When the remote parking request signal is received, the parking assist ECU 10 controls the display device 70 so that a mode setting image is displayed on the display 72. FIG. 9 shows an example of the mode setting image. As shown in FIG. 9, a mode setting image G20 includes a first mode selection image G21 and a second mode selection image G22. When the first mode selection image G21 is tapped, selection is made for a parking mode in which the target vehicle is parked in the predetermined parking area by moving the target vehicle forward or backward. When the second mode selection image G22 is tapped, selection is made for a parking mode in which the target vehicle is parked by perpendicular or parallel parking. The driver of the target vehicle can select the parking mode by tapping the first mode selection image G21 or the second mode selection image G22. In the present embodiment, the second mode selection image G22 is tapped. When the first mode selection image G21 or the second mode selection image G22 is tapped, the parking assist ECU 10 stores the selected parking mode and executes a second display process described later.

As described above, the parking assist ECU 10 determines that the drop-off space for the driver is narrow when the frontage M calculated by executing the frontage calculation process or the ratio B is smaller than the threshold. When determination is made that the drop-off space is narrow, the parking assist ECU 10 determines whether there is an adjacent parking spot that is an available parking area adjoining the target parking spot on the driver's seat side of the target vehicle in the case where the target vehicle is parked in the target parking spot by the automated parking control. Whether the adjacent parking spot is present can be determined by executing the available parking area detection process. When an area defined by, for example, two parking mark lines is present in the area adjoining the target parking spot and an object such as another vehicle is present in that area, the area is not the available parking area and is therefore not the adjacent parking spot.

When determination is made that the adjacent parking spot is present, the parking assist ECU 10 executes the first display process. When determination is made that the adjacent parking spot is not present, the parking assist ECU 10 executes a suggestion image display process. In the suggestion image display process, the parking assist ECU 10 controls the display device 70 so that a remote parking suggestion image is displayed on the display 72.

Figure 10:
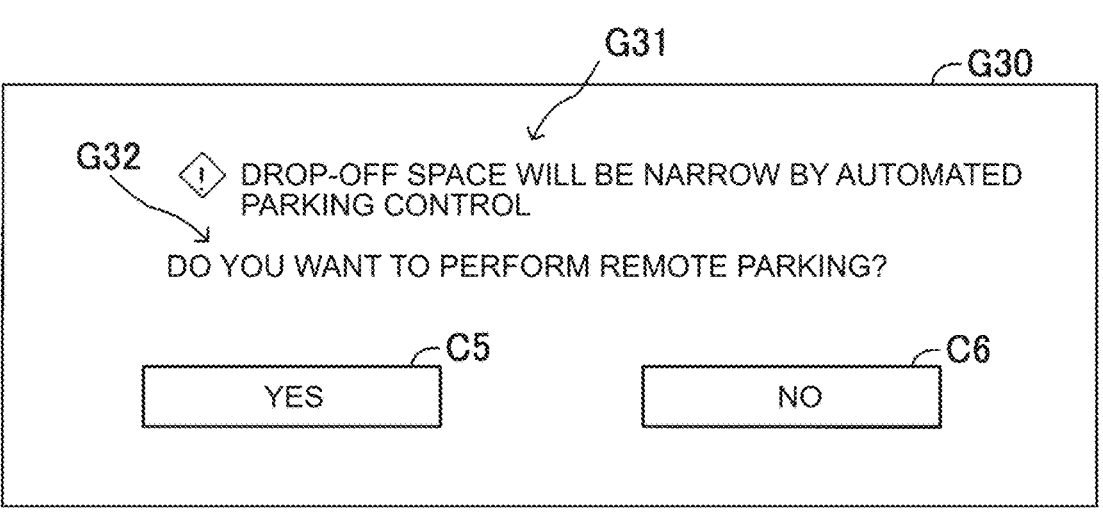
FIG. 10 shows an example of a remote parking suggestion image displayed on the display.

FIG. 10 shows an example of the remote parking suggestion image displayed on the display 72. As shown in FIG. 10, a remote parking suggestion image G30 includes a first text image G31 and a second text image G32 each composed of a predetermined character string. The character string in the first text image G31 provides information indicating that the drop-off space for the driver to drop off the target vehicle is narrow in the case where the target vehicle is parked in the target parking spot PS by executing the automated parking control. The character string in the second text image G32 provides information for prompting the driver to park the target vehicle in the target parking spot PS by the remote parking control instead of the automated parking control, that is, suggestion information for suggesting the remote parking control (remote parking suggestion information). The information provided by the first text image G31 and the second text image G32 is related to the size of the drop-off space for the driver in the case where the target vehicle is parked in the target parking spot by the automated parking control.

An acceptance icon C5 and a rejection icon C6 are displayed in the remote parking suggestion image G30. The acceptance icon C5 is provided to notify the parking assist ECU 10 about acceptance of the suggestion to park the target vehicle by the remote parking control. The rejection icon C6 is provided to notify the parking assist ECU 10 not to execute the remote parking control but to park the target vehicle by the automated parking control. When the rejection icon C6 is tapped, a rejection signal is transmitted from the display ECU 71 to the parking assist ECU 10. When the rejection signal is received, the parking assist ECU 10 executes the first display process. When the acceptance icon C5 is tapped, an acceptance signal is transmitted from the display ECU 71 to the parking assist ECU 10. When the acceptance signal is received, the parking assist ECU 10 executes the second display process.

Figure 11:
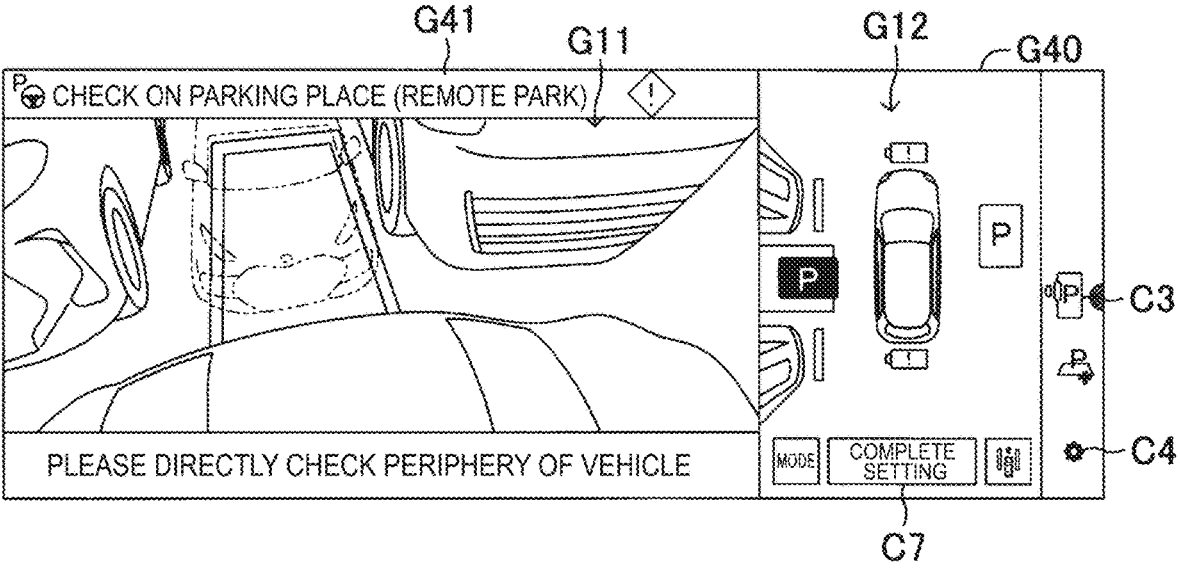
FIG. 11 shows an example of a second peripheral display image displayed on the display.

In the second display process, the parking assist ECU 10 controls the display device 70 so that a second peripheral display image is displayed on the display 72. The second peripheral display image is displayed to start execution of the remote parking control. FIG. 11 shows an example of the second peripheral display image. As shown in FIG. 11, a second peripheral display image G40 is basically the same as the first peripheral display image G10, and differs from the first peripheral display image G10 in that a text image G41 composed of a character string "Remote Park" is displayed at the upper part of the first viewpoint image G11, the remote parking icon C3 in the right part of the second viewpoint image G12 is highlighted, and a setting completion icon C7 is displayed in the lower part of the second viewpoint image G12 instead of the control start icon C2. When the acceptance icon C5 in the remote parking suggestion image G30 is tapped, the display 72 displays the second peripheral display image G40 without displaying the mode setting image G20 shown in FIG. 9. In this case, the parking assist ECU 10 sets the optimum parking mode. Therefore, the setting of the parking mode by the driver can be omitted, and convenience is improved.

When the setting completion icon C7 is tapped, the display ECU 71 transmits a control start signal for the remote parking control to the parking assist ECU 10. When the control start signal for the remote parking control is received, the parking assist ECU 10 starts executing the remote parking control. When the execution of the remote parking control is started, the parking assist ECU 10 first calculates the guidance route. Next, the parking assist ECU 10 controls the display device 70 so that the display 72 displays a message for prompting the driver to drop off the target vehicle. Alternatively, the parking assist ECU 10 controls the voice output device provided in the target vehicle so that the voice output device outputs voice guidance for prompting the driver to drop off the target vehicle. Thus, the driver drops off the target vehicle stopping at the temporary stop position.

Figure 12:
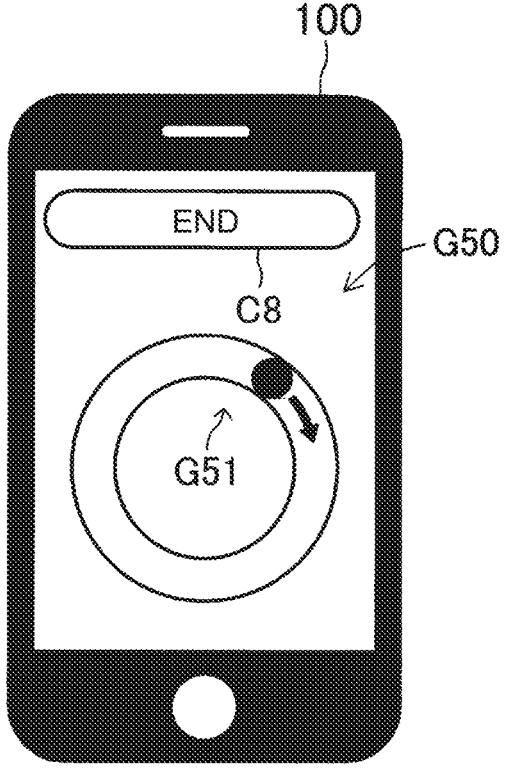
FIG. 12 shows an example of an operation image displayed on a smartphone in which a remote parking application has been activated.

Then, the driver activates the remote parking application installed in the smartphone 100 of the driver at a predetermined position outside the target vehicle. When the remote parking application is activated, a predetermined initial image is displayed on the smartphone 100. In this state, the driver performs a predetermined authentication operation (input of a login ID and a password). When the authentication operation is completed, connection between the smartphone 100 and the parking assist ECU 10 is established. Then, the smartphone 100 displays an operation image G50 shown in FIG. 12. The operation image G50 includes a ring-shaped dial image G51 and a termination icon C8 that is an image for terminating the remote parking control.

When the driver performs an operation of causing his/her finger to circle the dial image G51 (circling operation) in the operation image G50 displayed on the smartphone 100 while the driver is outside the target vehicle, the smartphone 100 issues a remote control permission signal for permitting the target vehicle to move along the guidance route. The remote control permission signal is received by the parking assist ECU 10 via the communication ECU 90. The remote control permission signal is issued while the driver is performing the circling operation. When the driver stops the circling operation, the issuance of the remote control permission signal is stopped. While the remote control permission signal is received, the parking assist ECU 10 supplies control signals for moving the target vehicle along the guidance route to the drive device 30, the braking device 40, the steering device 50, and the shift switching device 60. Thus, the drive device 30, the braking device 40, the steering device 50, and the shift switching device 60 are controlled so that the target vehicle moves along the guidance route.

When the central position G of the target vehicle reaches the target parking position C within the target parking spot PS by the remote parking control, the parking assist ECU 10 executes a termination process. In the termination process, the parking assist ECU 10 controls the SBW actuator 63 so that the shift position of the target vehicle becomes the parking position. The parking assist ECU 10 controls a door ECU (not shown in FIG. 1) to lock the doors of the target vehicle. Thus, the target vehicle is locked. After the termination 10 process is executed, the parking assist ECU 10 terminates the remote parking control.

When a predetermined termination condition is satisfied during the execution of the remote parking control, the parking assist ECU 10 terminates the execution of the remote parking control. Specifically, the termination condition is satisfied when the termination icon C8 in the operation image G50 on the smartphone 100 is tapped. The termination condition is also satisfied when the driver gets into the target vehicle and starts to operate one or more of the accelerator pedal, the brake pedal, the steering wheel, and the shift lever of the target vehicle. The termination condition is also satisfied when the duration of a state in which communication between the parking assist ECU 10 and the smartphone 100 is interrupted (state in which the user does not perform the circling operation on the smartphone 100) has exceeded a threshold.

Figure 13:
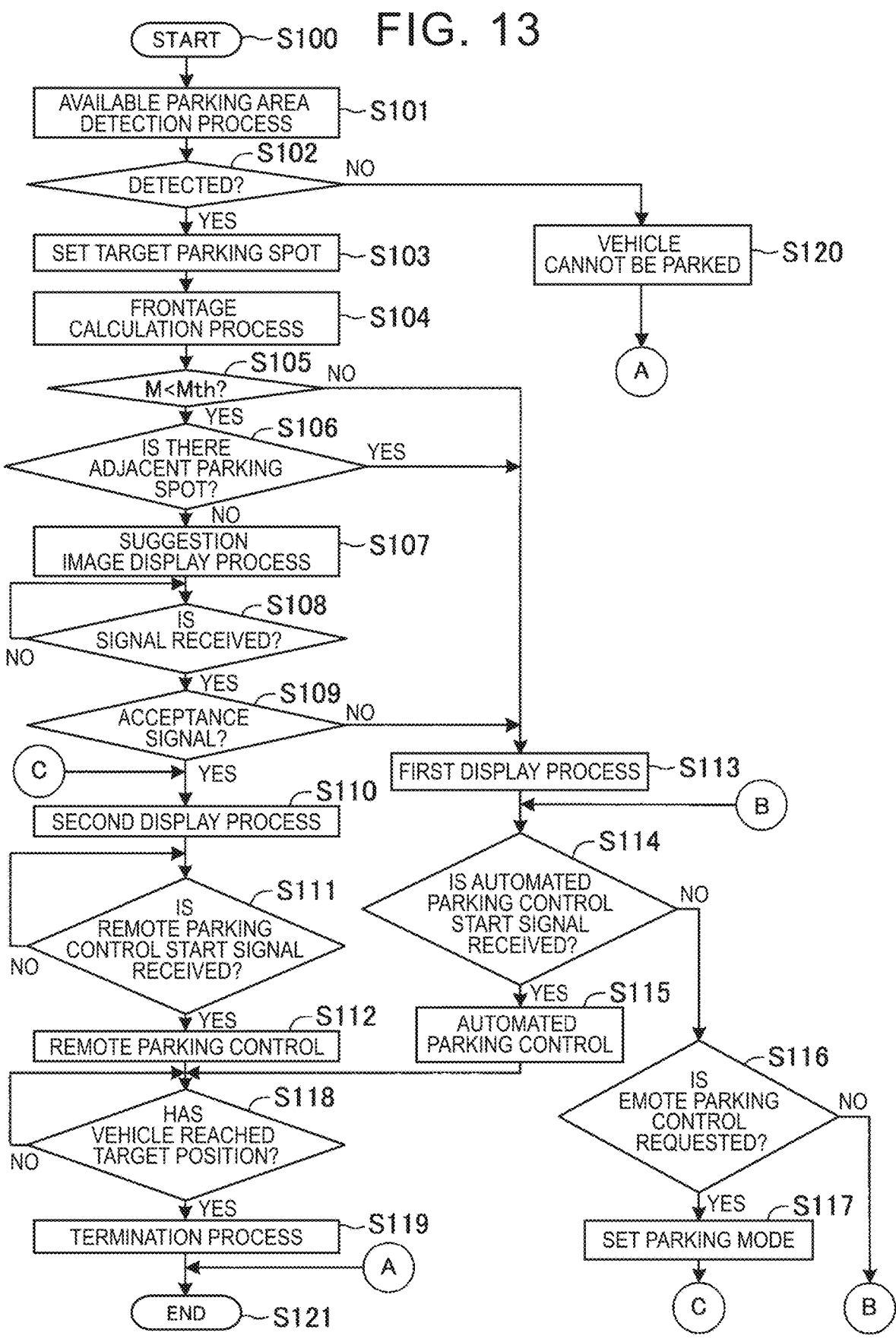
FIG. 13 is a flowchart showing an example of a flow of a parking assist processing routine to be executed by a CPU of a parking assist ECU.

FIG. 13 is a flowchart showing an example of a flow of a parking assist processing routine to be executed by the CPU 10*a* of the parking assist ECU 10 (hereinafter referred to as "CPU") to execute the automated parking control and the remote parking control. The parking assist processing routine shown in this flowchart is activated when the control request switch 23 is pushed. When the parking assist processing routine is activated, the CPU starts executing the parking assist processing routine from step ("step" is hereinafter abbreviated as "S") 100, and advances the process to S101.

In S101, the CPU executes the available parking area detection process. Next, the CPU advances the process to S102, and determines whether an available parking area is detected in the available parking area detection process. When determination is made that no available parking area is detected (S102: No), the CPU advances the process to S120. In S120, the CPU controls the display device 70 so that the display 72 displays a message indicating that no available parking area is present around the target vehicle or that the target vehicle cannot be parked around the target vehicle. Then, the CPU advances the process to S121 and terminates this routine.

When determination is made in S102 that the available parking area is detected (S102: Yes), the CPU advances the process to S103. In S103, the CPU sets a target parking spot. Next, the CPU advances the process to S104. In S104, the CPU executes the frontage calculation process to calculate the frontage M of the target parking spot PS. Next, the CPU advances the process to S105. In S105, the CPU determines whether the calculated frontage M is smaller than the distance threshold Mth. Based on this determination, determination is made as to whether the calculated frontage M satisfies the condition that holds when the drop-off space for the driver is narrow in the case where the target vehicle is parked in the target parking spot by the automated parking control. When determination is made that the frontage M is equal to or larger than the distance threshold Mth (S105: No), the CPU determines that the drop-off space is wide, and advances the process to S113. In S113, the CPU executes the first display process. Thus, the display 72 displays the first peripheral display image G10 as shown in FIG. 7.

After the first display process is executed in S113, the CPU advances the process to S114. In S114, the CPU determines whether a control start signal for the automated parking control that is transmitted from the display ECU 71 by tapping the control start icon C2 in the first peripheral display image G10 displayed on the display 72 is received. When determination is made that the control start signal for the automated parking control is received (S114: Yes), the CPU advances the process to S115 and starts executing the automated parking control. Thus, the parking assist device 1 assists the movement operation of the target vehicle to park the target vehicle in the target parking spot PS while the driver sits on the driver's seat of the target vehicle. Specifically, the CPU controls the drive device 30, the braking device 40, the steering device 50, and the shift switching device 60 of the target vehicle so that the target vehicle moves to a predetermined parking area within the target parking spot PS along the guidance route from a current temporary stop position.

Next, the CPU advances the process to S118. In S118, the CPU determines whether the central position G of the target vehicle has reached the target parking position C within the target parking spot PS. When determination is made that the central position G of the target vehicle has not reached the target parking position C (S118: No), the CPU repeats the determination in S118. When determination is made that the central position G of the target vehicle has reached the target parking position C (S118: Yes), the CPU advances the process to S119. In S119, the CPU executes the termination process. By executing the termination process, a notification is given about completion of the parking of the target vehicle. Then, the CPU advances the process to S121 and terminates this program.

When determination is made in S114 that the control start signal for the automated parking control is not input (S114: No), the CPU advances the process to S116. In S116, the CPU determines whether a remote parking request signal transmitted from the display ECU 71 to the parking assist ECU 10 by tapping the remote parking icon C3 in the first peripheral display image G10 is received. When determination is made that the remote parking request signal is not received (S114: No), the CPU returns the process to S114 and repeats the process in S114 and subsequent steps. When determination is made in S116 that the remote parking request signal is received (S116: Yes), the CPU advances the process to S117. In S117, the CPU executes a parking mode setting process. Thus, the display 72 displays the mode setting image G20 as shown in FIG. 9. The parking assist ECU 10 stores the parking mode set in the mode setting image G20. Next, the CPU advances the process to S110. The process of S110 will be described later.

When determination is made in S105 that the frontage M is smaller than the distance threshold Mth (S105: Yes), the CPU determines that the drop-off space is narrow, and advances the process to S106. In S106, the CPU determines whether an available parking area is detected in an area adjoining the target parking spot on the driver's seat side of the target vehicle in the case where the target vehicle is parked in the target parking spot by the automated parking control, that is, whether an adjacent parking spot is present. When determination is made that the adjacent parking spot is present (S106: Yes), the CPU advances the process to S113 and executes the process in S113 and subsequent steps. When determination is made that no adjacent parking spot is present (S106: No), the CPU advances the process to S107. When another vehicle is parked in the adjacent parking spot, the determination result in S106 is "No" because that area is not the available parking area.

In S107, the CPU executes the suggestion image display process. Thus, the display 72 displays the remote parking suggestion image G30 as shown in FIG. 10.

After the suggestion image display process is executed in S107, the CPU advances the process to S108. In S108, the CPU determines whether a signal (acceptance signal or rejection signal) transmitted from the display ECU 71 by tapping the acceptance icon C5 or the rejection icon C6 in the remote parking suggestion image G30 is received. When determination is made that the signal is not received (S108: No), the CPU repeats the determination in S108. When determination is made that the signal is received (S108: Yes), the CPU advances the process to S109.

In S109, the CPU determines whether the received signal is the acceptance signal, that is, whether the acceptance icon C5 in the remote parking suggestion image G30 is tapped. When determination is made that the received signal is not the acceptance signal (S109: No), that is, when the received signal is the rejection signal, the CPU advances the process to S113 and executes the process in S113 and subsequent steps.

When determination is made in S109 that the received signal is the acceptance signal (S109: Yes), the CPU advances the process to S110. In S110, the CPU executes the second display process. Thus, the display 72 displays the second peripheral display image G40 as shown in FIG. 11.

Next, the CPU advances the process to S111. In S111, the CPU determines whether a control start signal for the remote parking control that is transmitted from the display ECU 71 by tapping the setting completion icon C7 in the second peripheral display image G40 is received. When determination is made that the control start signal for the remote parking control is not received (S111: No), the CPU repeats the determination in S111. When determination is made that the control start signal for the remote parking control is received (S111: Yes), the CPU advances the process to S112. In S112, the CPU starts executing the remote parking control. Thus, the parking assist device 1 assists the movement operation of the target vehicle to park the target vehicle in the target parking spot PS while the driver is outside the target vehicle. Specifically, the CPU first notifies the driver by display on the display 72 or by voice guidance to drop off the target vehicle at the current position (temporary stop position). When the CPU recognizes that the driver has dropped off the target vehicle in response to the notification, the CPU executes a process such as an operation for authentication on the smartphone 100 located outside the target vehicle. When the authentication operation is completed, the CPU controls the drive device 30, the braking device 40, the steering device 50, and the shift switching device 60 of the target vehicle so that the target vehicle moves to the predetermined parking area within the target parking spot PS while the remote control permission signal is received from the smartphone 100.

After the execution of the remote parking control is started in S112, the CPU advances the process to S118. In S118, the CPU determines whether the central position G of the target vehicle has reached the target parking position C within the target parking spot PS. When determination is made that the central position G of the target vehicle has not reached the target parking position C (S118: No), the CPU repeats the process in S118. When determination is made that the central position G of the target vehicle has reached the target parking position C (S118: Yes), the CPU advances the process to S119.

In S119, the CPU executes the termination process. When the termination process is completed, the CPU advances the process to S121 and terminates this routine.

As described above, the parking assist ECU 10 of the parking assist device 1 according to the present embodiment calculates the frontage M of the target parking spot PS in advance (S104) before the start of the execution of the automated parking control (before the execution of the process of S115). When the frontage M satisfies the condition that holds when the drop-off space for the driver is narrow in the case where the target vehicle is parked in the target parking spot by the automated parking control, specifically, when the frontage M is smaller than the predetermined distance threshold Mth (S105: Yes), the parking assist ECU 10 controls the display device 70 so that the remote parking suggestion image G30 is displayed on the display 72 before the start of the execution of the automated parking control (S107). Therefore, the driver of the target vehicle can execute the parking of the target vehicle by the remote parking control without executing the parking of the target vehicle by the automated parking control. Thus, it is possible to suppress repetition of the parking in the target parking spot PS due to finding that the drop-off space is narrow after the target vehicle is parked in the target parking spot PS by executing the automated parking control. As a result, the period required for the parking can be shortened.

The parking assist ECU 10 of the parking assist device 1 according to the present embodiment calculates the frontage M of the target parking spot at the timing before the start of the execution of the automated parking control (before the execution of the process of S114) and after the determination that the driver intends to park the target vehicle in the target parking spot (after the control request switch 23 is pushed). When the calculated frontage M is smaller than the distance threshold Mth, the parking assist ECU 10 controls the display device 70 so that the remote parking suggestion image G30 is displayed on the display 72. Accordingly, the driver of the target vehicle can receive the suggestion of the parking by the remote parking control at the timing to park the target vehicle.

When the target parking spot is defined by two parallel parking mark lines, the parking assist ECU 10 of the parking assist device 1 according to the present embodiment calculates a distance between the two parking mark lines as the frontage M. When the target vehicle is positioned around the frontage of the target parking spot, the parking assist ECU 10 can calculate the frontage M of the target parking spot relatively easily based on the information from the surrounding information sensor (camera sensor 22).

The parking assist ECU 10 of the parking assist device 1 according to the present embodiment does not execute the suggestion image display process in S107 when the frontage M calculated by executing the frontage calculation process is smaller than the predetermined distance threshold Mth (S105: Yes) and there is a parking spot (adjacent parking spot) adjoining the target parking spot on the driver's seat side of the target vehicle in the case where the target vehicle is parked in the target parking spot by the automated parking control (S106: Yes). When the adjacent parking spot is present, the door on the driver's seat side can be opened wide to enter the area within the adjacent parking spot even if the frontage of the target parking spot is narrow. Therefore, the drop-off space for the driver is wide. In such a case, the notification about the information on the narrow drop-off space and/or the suggestion information is not given by executing the suggestion image display process. Thus, it is possible to suppress the notification about erroneous information.

Although the parking assist device according to the embodiment of the present disclosure has been described above, the parking assist device according to the present disclosure should not be construed as being limited to the above embodiment. For example, in the above embodiment, when the calculated frontage M satisfies the condition that holds when the drop-off space is narrow, specifically, when the frontage M or the ratio B is smaller than the predetermined threshold, the parking assist ECU 10 controls the display device 70 so that the display 72 displays the remote parking suggestion image G30 including the text image (G31) indicating that the drop-off space is narrow and the text image (G32) indicating the suggestion of the parking in the target parking spot by the remote parking control. The parking assist ECU 10 may control the display device 70 so that the display 72 displays only the information indicating that the drop-off space is narrow, or may control the display device 70 so that the display 72 displays only the suggestion information on the remote parking control.

In the above embodiment, when the calculated frontage M satisfies the condition that holds when the drop-off space is narrow, the parking assist ECU 10 controls the display device 70 so that the display 72 displays the remote parking suggestion image G30 including the information for suggesting the parking in the target parking spot PS by the remote parking control. The suggestion information in this case is not limited to the suggestion of the parking in the target parking spot by the remote parking control. For example, the suggestion information may be information for suggesting parking of the target vehicle in a parking spot other than the target parking spot PS. The suggestion information may be suggestion information indicating that the parking in the target parking spot PS by the automated parking control is not recommended.

In the above embodiment, when the calculated frontage M satisfies the condition that holds when the drop-off space is narrow, the parking assist ECU 10 controls the display device 70 to display the predetermined information by executing the suggestion image display process. When the frontage M calculated in advance satisfies a condition that holds when the drop-off space is wide, for example, when the frontage M is equal to or larger than the predetermined distance threshold, the parking assist ECU 10 can control the display device 70 so that the display 72 displays information indicating that the drop-off space is wide, or information indicating that the driver can safely drop off the target vehicle in the case where the target vehicle is parked in the target parking spot PS by the automated parking control because the drop-off space is wide. That is, the parking assist ECU 10 can control the display device 70 so that the predetermined information is displayed on the display 72 based on the calculated frontage M.

The information displayed on the display 72 based on the calculated frontage M is not limited to the information described in the above embodiment. For example, the parking assist ECU 10 can control the display device 70 so that the calculated frontage M is displayed on the display 72. That is, the parking assist ECU 10 can control the display device 70 so that the information related to the size of the drop-off space for the driver in the case where the target vehicle is parked in the target parking spot by the automated parking control is displayed on the display 72 based on the calculated frontage M.

In the above embodiment, the parking assist ECU 10 controls the display device 70 based on the calculated frontage M. The parking assist ECU 10 can control a notification device other than the display device 70. For example, the parking assist ECU 10 can control the voice output device or the sound output device to give a voice or sound notification about the information related to the size of the drop-off space.

In this way, the present disclosure can be modified without departing from its gist.

What is claimed is:

1. A parking assist device comprising:
 at least one first processor configured to:
  execute automated parking control, the automated parking control being control for assisting an operation of a target vehicle to park the target vehicle in a predetermined target parking spot while a driver of the target vehicle sits on a driver's seat of the target vehicle, and
  display predetermined information related to the predetermined target parking spot; and
 a surrounding information sensor configured to acquire information on objects and indications around the target vehicle, wherein
 the at least one processor is configured to:
 calculate a frontage of the target parking spot in advance before a start of execution of the automated parking control based on the information acquired by the surrounding information sensor, and
 display information related to a size of a drop-off space for the driver before the start of execution of the automated parking control based on the calculated frontage, and
 based on the calculated frontage satisfying a first condition, the at least one processor is configured to:
  display suggestion information for suggesting a parking method other than a parking method for parking the target vehicle in the target parking spot by executing the automated parking control, the first condition being a condition that holds when the drop-off space for the driver is narrow in the case where the target vehicle is intended to be parked in the target parking spot by the automated parking control, the suggestion information including remote parking suggestion information for suggesting a parking method for parking the target vehicle in the target parking spot by remote parking control, and the remote parking control being control for assisting an operation of the target vehicle to park the target vehicle in the target parking spot while the driver is outside the target vehicle, and execute the remote parking control to park the target vehicle in the target parking spot based on an instruction from the driver associated with the remote parking suggestion information.

2. The parking assist device according to claim 1, wherein the at least one processor is further configured to, based on the calculated frontage satisfying the first condition, display information indicating that the drop-off space is narrow.

3. The parking assist device according to claim 1, wherein the at least one processor is configured to, when the target parking spot is defined by two parallel parking mark lines, calculate a distance between the two parking mark lines as the frontage.

4. The parking assist device according to claim 3, wherein the at least one processor is configured to, when an adjacent parking spot is available and the calculated frontage satisfies the first condition, not display the suggestion information, the adjacent parking spot being a parking spot adjoining a driver's seat side of the target vehicle in the case where the target vehicle is intended to be parked in the target parking spot by the automated parking control.

5. The parking assist device according to claim 4, wherein the adjacent parking spot is an empty parking spot.

6. The parking assist device according to claim 1, wherein the at least one processor is configured display the remote parking suggestion information based on satisfaction of a condition that the calculated frontage or a ratio of the calculated frontage to a width of the target vehicle is smaller than a predetermined threshold.

7. The parking assist device according to claim 1, wherein the at least one processor is configured to park the target vehicle at a central position of the target parking spot in a width direction.

8. The parking assist device according to claim 1, wherein, based on the calculated frontage satisfying a second condition, the at least one processor is configured to:

display information indicating that the drop-off space is wide and information relating to execution of the automated parking control, and execute the automated parking control based on an instruction from the driver associated with the information relating to the execution of the automated parking control; and wherein the second condition is a condition that holds when the drop-off space for the driver is wide in the case where the target vehicle is intended to be parked in the target parking spot by the automated parking control.

9. The parking assist device according to claim 8, wherein the second condition is satisfied when the calculated frontage is equal to or greater than a predetermined threshold.

10. The parking assist device according to claim 1, wherein the at least one processor is further configured to execute the remote parking control according to a parking mode selected by the driver, the parking mode including perpendicular or parallel parking.

11. The parking assist device according to claim 1, wherein the first condition is satisfied when a ratio of the calculated frontage to a width of the target vehicle is smaller than a predetermined ratio threshold.

12. A control method to be executed by a computer of a parking assist device mounted on a target vehicle having an autonomous driving function, the control method comprising:

acquire information on objects and indications around the target vehicle;

calculating a frontage of a predetermined target parking spot in advance before a start of execution of automated parking control based on the acquired information, the automated parking control being control for assisting an operation of the target vehicle to park the target vehicle in a predetermined target parking spot while a driver of the target vehicle sits on a driver's seat of the target vehicle;

based on the calculated frontage, displaying information related to a size of a drop-off space for the driver before the start of execution of the automated parking control; and based on the calculated frontage satisfying a first condition, displaying suggestion information for suggesting a parking method other than a parking method for parking the target vehicle in the target parking spot by executing the automated parking control, the first condition being a condition that holds when the drop-off space for the driver is narrow in the case where the target vehicle is intended to be parked in the target parking spot by the automated parking control, the suggestion information including remote parking suggestion information for suggesting a parking method for parking the target vehicle in the target parking spot by remote parking control, and the remote parking control being control for assisting an operation of the target vehicle to park the target vehicle in the target parking spot while the driver is outside the target vehicle; and executing the remote parking control to park the target vehicle in the target parking spot based on an instruction associated with the remote parking suggestion information.

13. A non-transitory storage medium storing instructions that are executable by one or more processors included in a computer of a parking assist device mounted on a target vehicle having an autonomous driving function and that cause the one or more processors to perform functions comprising:

calculating a frontage of a predetermined target parking spot in advance before a start of execution of automated parking control, the automated parking control being control for assisting an operation of the target vehicle to park the target vehicle in the target parking spot while a driver of the target vehicle sits on a driver's seat of the target vehicle;

based on the calculated frontage, displaying information related to a size of a drop-off space for the driver before the start of execution of the automated parking control; and based on the calculated frontage satisfying a first condition, displaying suggestion information for suggesting a parking method other than a parking method for parking the target vehicle in the target parking spot by executing the automated parking control, the first condition being a condition that holds when the drop-off space for the driver is narrow in the case where the target vehicle is intended to be parked in the target parking spot by the automated parking control, the suggestion information including remote parking suggestion information for suggesting a parking method for parking the target vehicle in the target parking spot by remote parking control, and the remote parking control being control for assisting an operation of the target vehicle to park the target vehicle in the target parking spot while the driver is outside the target vehicle, and executing the remote parking control to park the target vehicle in the target parking spot based on an instruction associated with the remote parking suggestion information.

* * * * *